(12) United States Patent
Gunter et al.

(10) Patent No.: US 12,455,762 B2
(45) Date of Patent: Oct. 28, 2025

(54) EXPLICIT SCHEDULING OF ON-CHIP OPERATIONS

(71) Applicant: Google LLC, Mountain View, CA (US)

(72) Inventors: Michial Allen Gunter, Oakland, CA (US); Charles Henry Leichner, IV, Palo Alto, CA (US)

(73) Assignee: Google LLC, Mountain View, CA (US)

(*) Notice: Subject to any disclaimer, the term of this patent is extended or adjusted under 35 U.S.C. 154(b) by 751 days.

(21) Appl. No.: 17/635,772

(22) PCT Filed: Aug. 14, 2020

(86) PCT No.: PCT/US2020/046392
§ 371 (c)(1),
(2) Date: Feb. 16, 2022

(87) PCT Pub. No.: WO2021/034675
PCT Pub. Date: Feb. 25, 2021

(65) Prior Publication Data
US 2022/0326988 A1      Oct. 13, 2022

Related U.S. Application Data

(60) Provisional application No. 62/887,724, filed on Aug. 16, 2019.

(51) Int. Cl.
*G06F 9/46* (2006.01)
*G06F 9/30* (2018.01)
(Continued)

(52) U.S. Cl.
CPC ........ *G06F 9/4881* (2013.01); *G06F 9/30036* (2013.01); *G06F 9/321* (2013.01);
(Continued)

(58) Field of Classification Search
CPC .... G06F 9/4881; G06F 9/30036; G06F 9/321; G06F 9/3893; G06F 15/7807; G06N 3/063
See application file for complete search history.

(56) References Cited

U.S. PATENT DOCUMENTS

2015/0186313 A1   7/2015   Sodhi et al.
2019/0114548 A1   4/2019   Wu et al.
(Continued)

FOREIGN PATENT DOCUMENTS

CN   108268386   7/2018
CN   108573304   9/2018
(Continued)

OTHER PUBLICATIONS

Notice of Allowance in Japanese Appln. No. 2022-509681, dated Apr. 17, 2023, 9 pages (with English translation).
(Continued)

*Primary Examiner* — Gregory A Kessler
(74) *Attorney, Agent, or Firm* — Fish & Richardson P.C.

(57) ABSTRACT

Methods, systems, and apparatus, including computer programs encoded on a computer storage medium, for obtaining a first schedule, for a first hardware block of an integrated circuit device, where the first schedule identifies a first set of operations to be performed by the first hardware block. Obtaining a second schedule for a second hardware block of the integrated circuit device, where the second schedule identifies a second set of operations to be performed by the second hardware block and where operations of the second schedule are coordinated with operations of the first schedule such that the first schedule triggers the first hardware block to send data to the second block at a first pre-scheduled value of a counter, and the second schedule triggers the second hardware block to accept the data at an input at a second pre-scheduled value of the counter that is (Continued)

after the first pre-scheduled value. Performing, by the first hardware block, the first set of operations according to the first schedule, and performing, by the second hardware block, the second set of operations according to the second schedule.

20 Claims, 11 Drawing Sheets

(51) Int. Cl.
*G06F 9/32* (2018.01)
*G06F 9/38* (2018.01)
*G06F 9/48* (2006.01)
*G06F 15/78* (2006.01)
*G06N 3/063* (2023.01)

(52) U.S. Cl.
CPC ........ G06F 9/3893 (2013.01); G06F 15/7807 (2013.01); G06N 3/063 (2013.01)

(56) References Cited

U.S. PATENT DOCUMENTS

| | | | |
|---|---|---|---|
| 2019/0121388 A1 | 4/2019 | Knowles et al. | |
| 2019/0121784 A1 | 4/2019 | Wilkinson et al. | |
| 2019/0340023 A1* | 11/2019 | Brewer | G06F 9/3851 |

FOREIGN PATENT DOCUMENTS

| | | |
|---|---|---|
| CN | 108694109 | 10/2018 |
| JP | 2016-511853 | 4/2016 |
| JP | 2018-101917 | 6/2018 |
| JP | 2019-079522 | 5/2019 |
| JP | 2019-079526 | 5/2019 |
| TW | 201826122 | 7/2018 |
| TW | 201901534 | 1/2019 |
| WO | WO 2014099539 | 6/2014 |

OTHER PUBLICATIONS

Notice of Allowance in Japanese Appln. No. 2022-509681, dated Jul. 31, 2023, 5 pages (with English translation).
International Preliminary Report on Patentability International Appln. No. PCT/US2020/046392, dated Feb. 17, 2022, 12 pages.
International Search Report and Written Opinion in International Appln. No. PCT/US2020/046392, dated Nov. 5, 2020, 15 pages.
Liang et al., "An Architecture and Compiler for Scalable On-Chip Communication," IEEE Transactions on Very Large Scale Integration (VLSI) Systems, Jul. 2004, 12(7):711-726.
Office Action in Taiwan Appln. No. 109127774, dated Aug. 17, 2021, 21 pages (with English translation).
Notice of Allowance in Chinese Appln. No. 202080057906.0, mailed on Jan. 6, 2024, 7 pages (with English translation).
Office Action in Korean Appln. No. 10-2022-7007685, mailed on Dec. 8, 2023, 20 pages (with English translation).
Notice of Allowance in Korean Appln. No. 10-2022-7007685, mailed on Oct. 30, 2024, 7 pages (with English translation).

* cited by examiner

EXPLICIT SCHEDULING OF ON-CHIP OPERATIONS

CROSS-REFERENCE TO RELATED APPLICATIONS

This application is a National Stage Application under 35 U.S.C. § 371 and claims the benefit of International Application No. PCT/US2020/046392, filed Aug. 14, 2020, which claims priority to U.S. Provisional Application No. 62/887,724, filed Aug. 16, 2019, entitled EXPLICIT SCHEDULING OF ON-CHIP OPERATIONS. The disclosures of the foregoing applications are incorporated herein by reference in their entirety.

TECHNICAL FIELD

The present disclosure relates to integrated circuit operations and explicitly scheduling the individual operations of different integrated circuit hardware blocks.

BACKGROUND

Processors and microcontroller chips are often controlled by software programs. The programs include a list of operations that are performed sequentially in repeated loops. Some software sub-routines are initiated in response to a change in an input value or the triggering of an external or internal interrupt signal. The software programs and sub-routines are generally executed by central control circuitry which routes data and controls other functional units on the chip to execute portions of the programed operations.

SUMMARY

In general, in some aspects, the subject matter of the present disclosure can be embodied in methods that include the actions of obtaining a first schedule, for a first hardware block of an integrated circuit device, where the first schedule identifies a first set of operations to be performed by the first hardware block. The actions include obtaining a second schedule for a second hardware block of the integrated circuit device, where the second schedule identifies a second set of operations to be performed by the second hardware block and where operations of the second schedule are coordinated with operations of the first schedule such that the first schedule triggers the first hardware block to send data to the second block at a first pre-scheduled value of a counter, and the second schedule triggers the second hardware block to accept the data at an input at a second pre-scheduled value of the counter that is after the first pre-scheduled value. The actions include performing, by the first hardware block, the first set of operations according to the first schedule, and performing, by the second hardware block, the second set of operations according to the second schedule. Other implementations of this aspect include corresponding systems, apparatus, and computer programs, configured to perform the actions of the methods, encoded on computer storage devices. These and other implementations can each optionally include one or more of the following features.

In some implementations, the first schedule and the second schedule each includes a portion of a program executed by the integrated circuit device.

In some implementations, the first set of operations and the second set of operations each includes a respective portion of a machine learning program.

In some implementations, the each operation in the first set of operations executes in a predetermined number of clock cycles.

In some implementations, operations of the first schedule and the second schedule are coordinated to allow exchange of data between the first hardware block and the second hardware block independent of flow control signals.

In some implementations, the actions include decompressing, by the first hardware block, a portion of the first schedule before executing operations included in the portion.

In some implementations, the first schedule includes, for each operation in the first set of operations, a scheduled counter value and data indicating a particular operation to be executed by the first hardware block at the scheduled counter value.

In some implementations, the performing, by the first hardware block, the first set of operations according to the first schedule includes the actions of: receiving, from a counter, a first counter value that equals a first scheduled counter value of a first operation in the first set of operations; in response to receiving the first counter value, causing a first set of one or more computational units of the first hardware block to execute the first operation; receiving, from the counter, a second counter value that equals a second scheduled counter value of a second operation in the first set of operations; and in response to receiving the second counter value, causing a second set of one or more computational units of the first hardware block to execute the second operation.

In some implementations, the first hardware block and the second hardware block are hardware tiles including special purpose circuitry configured to perform neural network operations.

Another general aspect can be embodied in an integrated circuit device that includes a counter, a first hardware block communicably coupled to the counter, and a second hardware block communicably coupled to the counter and to the first hardware block. The first hardware block is configured to operate according to a first schedule that includes a first set of operations each of which is scheduled to be executed by the first hardware block at a first respective value of the counter. The second hardware block is configured to operate according to a second schedule that includes a second set of operations each of which is scheduled to be executed by the second hardware block at a second respective value of the counter. Operations of the second schedule are coordinated with operations of the first schedule such that the first schedule triggers the first hardware block to send data to the second hardware block at a first pre-scheduled value of the counter, and the second schedule triggers the second hardware block to accept the data at an input at a second pre-scheduled value of the counter that is after the first pre-scheduled value. This and other implementations can each optionally include one or more of the following features.

In some implementations, the first set of operations and the second set of operations each include a respective portion of a machine learning program.

In some implementations, each operation in the first set of operations executes in a predetermined number of clock cycles.

In some implementations, operations of the first schedule and the second schedule are coordinated to allow exchange of data between the first hardware block and the second hardware block independent of flow control signals.

In some implementations, the integrated circuit device includes a plurality of other hardware blocks, where operations of the first schedule are coordinated with respective operation schedules of the other hardware blocks to allow exchange data between the first hardware block and one or more of the other hardware blocks independent of data flow control signals.

In some implementations, the first hardware block includes local memory configured to store the first schedule, and control circuitry coupled to the local memory and configured to execute the first set of operations of the first schedule. In some implementations, the control circuitry is configured to decompress a portion of the first schedule before executing operations included in the portion.

In some implementations, the integrated circuit device is an application specific integrated circuit.

In some implementations, the first hardware block and the second hardware block are hardware tiles including special purpose circuitry configured to perform neural network operations. In some implementations, the first hardware block includes a computational array of cells, and local memory coupled to the computational array of cells.

In some implementations, the first schedule and the second schedule each include a portion of a program executed by the integrated circuit device.

A third general aspect can be embodied in an integrated circuit device that includes a first hardware block, a second hardware block, and a compiler. The first hardware block is configured to operate according to a first schedule that includes a first set of operations each of which is scheduled to be executed by the first hardware block at a respective pre-scheduled time. The first hardware block includes a computational array comprising a plurality of cells, each cell of the plurality of cells being configured to perform a multiply-accumulate operation. The second hardware block is communicably coupled to the first hardware block. The second hardware block is configured to operate according to a second schedule that includes a second set of operations each of which is scheduled to be executed by the second hardware block at a respective pre-scheduled time. The compiler is configured to generate the first schedule and the second schedule, where the first set of operations of the first schedule are coordinated with the second set of operations of the second schedule to permit data transfer between the first hardware block and the second hardware block, and where each of the first schedule and the second schedule respectively represent a portion of a neural network program to be executed by the integrated circuit device as a whole.

In some implementations, the first set of operations and the second set of operations comprise a respective portion of a machine learning program.

In some implementations, each operation in the first set of operations executes in a predetermined number of clock cycles.

Some implementations include at least one other hardware block, where operations of the first schedule are coordinated with respective operation schedules of the at least one other hardware block to permit data transfer between the first hardware block and the at least one other hardware block. In some implementations, the at least one other hardware block includes circuitry configured to perform scalar operations. In some implementations, the at least one other hardware block includes circuitry configured to perform vector operations.

In some implementations, the computational array of the first hardware block includes circuitry configured to perform matrix operations and the second hardware block includes circuitry configured to perform memory access operations. In some implementations, the second hardware block stores the first schedule of operations. In some implementations, the first hardware block is configured to transfer an output of the computational array to the second hardware block.

In some implementations, the first hardware block and the second hardware block are hardware tiles including special purpose circuitry configured to perform neural network operations.

A fourth general aspect can be embodied in methods that include the actions of generating, by a compiler of an integrated circuit device, a first schedule that includes a first set of operations each of which is scheduled to be executed by a first hardware block at a respective pre-scheduled time. The actions include generating, by the compiler, a second schedule that includes a second set of operations each of which is scheduled to be executed by a second hardware block at a respective pre-scheduled time. The actions include performing, by the first hardware block, the first set of operations according to the first schedule, where the first hardware block includes a computational array comprising a plurality of cells, each cell of the plurality of cells being configured to perform a multiply-accumulate operation. The actions include performing, by the second hardware block of the integrated circuit device, the second set of operations according to the second schedule, where each of the first schedule and the second schedule respectively represent a portion of a neural network program to be executed by the integrated circuit device as a whole.

In some implementations, the first set of operations and the second set of operations include a respective portion of a machine learning program.

In some implementations, each operation in the first set of operations executes in a predetermined number of clock cycles.

In some implementations, the integrated circuit includes at least one other hardware block, where operations of the first schedule are coordinated with respective operation schedules of the at least one other hardware block to permit data transfer between the first hardware block and the at least one other hardware block. In some implementations, the at least one other hardware block includes circuitry configured to perform scalar operations. In some implementations, the at least one other hardware block includes circuitry configured to perform vector operations.

In some implementations, the computational array of the first hardware block includes circuitry configured to perform matrix operations and the second hardware block includes circuitry configured to perform memory access operations.

In some implementations, the actions include storing, by the second hardware block, the first schedule of operations.

In some implementations, the actions include transferring, by the first hardware block, an output of the computational array of the first hardware block to the second hardware block.

In some implementations, the first hardware block and the second hardware block are hardware tiles including special purpose circuitry configured to perform neural network operations.

Various implementations include one or more of the following advantages. For example, in some implementations, the explicitly scheduled chip operations can improve the efficiency and accuracy with which chip control logic is written. For example, explicitly scheduled chip operations make the chip operations more deterministic for computationally intensive operations, such as machine learning operations. When the operations are more deterministic, hardware control testing and debugging can be performed in a more precise manner.

As another example, the use of deterministic scheduling may reduce the complexity of hardware. For instance, since the timing of every operation is known in advance through scheduling, operations can be coordinated precisely and globally once, in software. Global knowledge is not feasible in hardware, so the quality of scheduling is accomplished in software; reducing the need to conduct scheduling operations in hardware makes the hardware simpler.

Deterministic scheduling may also improve the debugging process. For example, the use of deterministic scheduling means that one can debug the programming of the hardware on a simulator knowing that the actual hardware will perform the same way.

The details of one or more embodiments of the invention are set forth in the accompanying drawings and the description below. Other features and advantages will be apparent from the description, the drawings, and the claims.

DETAILED DESCRIPTION

Figure 1:
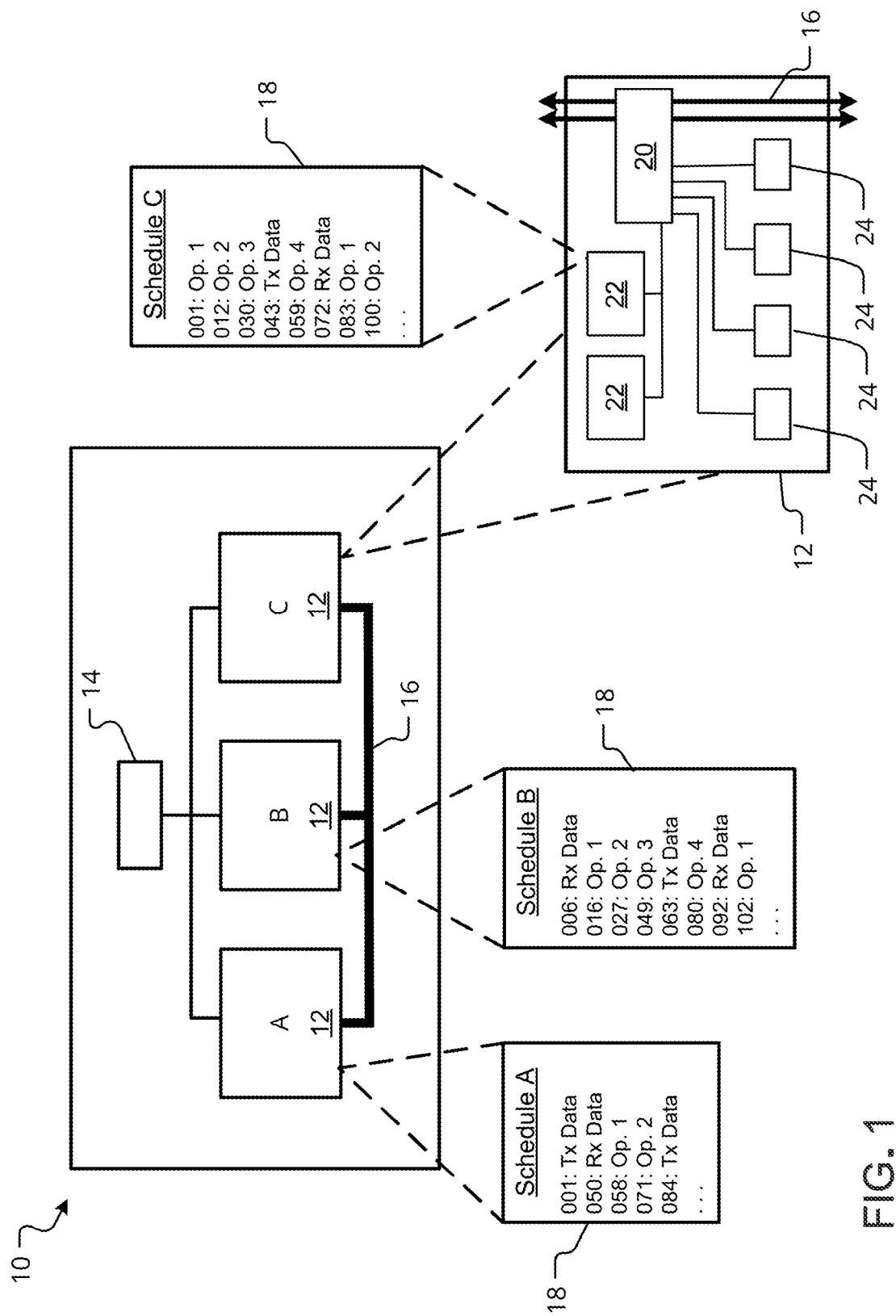
FIG. 1 is a schematic that illustrates an example integrated circuit device configured to operate according to scheduled operations.

In general, the disclosure relates to performing operations by a semiconductor device according to time-scheduled operations. More specifically, the disclosure relates to a semiconductor chip with individual hardware blocks that operate according to individualized operation schedules to perform a coordinated program executed by the semiconductor chip as a whole. In other words, the individual hardware blocks execute their respective operations at scheduled times according to a common clock (e.g., a counter) rather than, e.g., executing operations in response to control signals or according to an unscheduled sequential list of process instructions. For example, the chip includes several hardware blocks. Each hardware block represents a relevant set of replicated logic such as a subset of electrical circuitry (e.g., logic circuitry) on a chip that is designed to perform a particular set of tasks independent of tasks performed by other hardware blocks. Hardware blocks can be configured to perform operations that include, but are not limited to, matrix operations, vector operations, scalar operations, logic operations, memory access operations, external communication operations, or a combination thereof Each hardware block executes an individual schedule of operations specific to the hardware block. Together the individual schedules for each hardware block represent a complete program (e.g., a neural network operation) that is executed by the chip as a whole. Each schedule includes a series of operations that are scheduled to be performed by an individual hardware block at specific counter times. For example, the hardware blocks can each execute the operations in their respective schedule based on a current count value of a common clock on the chip.

Furthermore, the schedules are arranged to coordinate data transfers amongst the various hardware blocks without the need for flow control logic. For example, operations of a first schedule for a first hardware block are coordinated with operations of a second schedule for a second hardware block such that an operation in the first schedule for the first hardware block to send data to the second hardware block is timed to correspond with operations in the second schedule that requires the second hardware block to read the data from an input buffer and operate on the data. In other words, operations of the individual schedules are coordinated such that data transfers between hardware blocks can be performed independent of traditional flow control logic. That is, the coordinated schedules themselves serve to preclude communication errors such as data collisions on internal busses and/or data buffer overflows. In some implementations, the deterministic coordination of hardware block operations and pre-scheduling of hardware block operations allows one to know precisely when certain operations will take place on a chip. The deterministic scheduling process may be advantages over non-deterministic chip operations because, for example, it may improve the ease and efficiency with which debugging operations can be performed.

In some implementations, the semiconductor chip is an application-specific integrated circuit (ASIC) designed to perform machine learning operations. An ASIC includes, e.g., an integrated circuit (IC) that is customized for a particular use. For example, an ASIC may be designed to perform operations of machine learning models including, e.g., recognizing objects in images as part of deep neural networks, machine translation, speech recognition, or other machine learning algorithms. When used as an accelerator for a neural network, for instance, an ASIC can receive inputs to the neural network and compute a neural network inference for the inputs. Data inputs to a neural network layer, e.g., either the input to the neural network or the outputs of another layer of the neural network, can be referred to as activation inputs. The inferences can be computed in accordance with respective sets of weight inputs associated with the layers of the neural network. For example, some or all of the layers may receive a set of activation inputs and process the activation inputs in accordance with the set of weight inputs for the layer to generate outputs. Moreover, the repetitive nature of computational operations performed to compute neural network inferences are conducive to explicitly scheduled chip operations.

FIG. 1 is a schematic that illustrates a simplified example of an integrated circuit chip 10 that is configured to operate according to scheduled operations. The chip 10 can be a general purpose integrated circuit or a special purpose integrated circuit. For example, the chip 10 can be an ASIC, a field programmable gate array (FPGA), a graphics processing unit (GPU), or any other suitable integrated circuit. The chip 10 includes multiple hardware blocks 12, a counter 14, and a shared data bus 16. The chip 10 is shown in simplified manner for purposes of illustration and discussion, however, in implementations, the chip 10 will include additional components such as communication interfaces, memory, and other circuitry appropriate to the purpose of the chip 10.

The hardware blocks 12 represent relevant sets of replicated logic such as a subset of electrical circuitry (e.g., logic circuitry) on the chip 10 that is designed to perform a particular set of tasks independent of tasks performed by other hardware blocks 12. Furthermore, each hardware block 12 can represent different types of circuitry, e.g., hardware block A can represent a communication interface that is configured to transfer data between the chip 10 and other semiconductor components external to the chip 10. Hardware block B and hardware block C can represent "tiles" of a special purpose chip designed to execute machine learning functions (discussed in more detail below). For example, hardware block B and hardware block C can represent computational nodes of a neural network configured to perform matrix operations.

The counter 14 increments in accordance with a common clock signal on the chip 10. The counter 14 can be, e.g., a 24 bit, 32 bit, or other sized synchronous counter. The counter 14 outputs chip count values, e.g., a "chip time," to the hardware blocks 12 for synchronizing the explicitly scheduled operations of each individual hardware block 12. In some implementations, each hardware block 12 has an individual counter 14, rather than a single counter 14 for the chip 10. The individual counters can be synchronized by a common clock on the chip 10. Moreover, the count values of the individual counters can be synchronized by a common reset signal on the chip, for example.

Each hardware block 12 operates according to its own individualized operations schedule 18. The operations schedules 18 each represent a portion of a program to be executed by the chip 10 as a whole, and each operation schedule 18 individual represents that portion of the program that to be executed by an individual hardware block 12. The operations schedule 18 includes a set of operations to be executed by the hardware block at predetermined counter values. In other words, the operations schedule 18 can be thought of as a list timers that trigger particular operations to be executed by a particular hardware block 12 at pre-scheduled "chip times." For example, each schedule 18 can include a list of execution counter values (e.g., execution times) with an associated operation to be executed at the counter value. In some examples, each operation in an operation schedule 18 is represented by the scheduled counter value and data, such as an operation code, that identifies the operation to be executed by a particular hardware block 12 at the scheduled counter value.

The operations of each schedule 18 are coordinated with those of all the other schedules to avoid errors such as double booking of shared resources (e.g., the data bus 16). The operations of each schedule 18 are also coordinated to permit data transfers between hardware blocks 12 independent of flow control logic (e.g., such as interrupt signals). For example, data transfers between two hardware blocks 12 are scheduled such that a receiving hardware block 12 is schedule to read data from a data bus or input buffer at a counter value that 1) ensures the correct data is present at the read time based on the scheduled transmit count value of the sending hardware block 10 and 2) prevents input buffer overflows by scheduling the receiving hardware block 12 to read the data before the buffer overflows (e.g., the read is scheduled before additional data is scheduled to be sent to the receiving hardware block 12).

The individualized operation schedules 18 may be particularly useful for applications that are computationally intense, highly repetitive, or both, such as neural network and graphic processing computations. For example, the use of explicitly defined schedules for individual hardware blocks 12 on a chip 10 can be conducive to deterministic operations in which scheduled operations are each executed in a predefined number of clock cycles.

The operation schedules 18 for hardware blocks 12 of a chip 10 can be generated by a program compiler. For example, a compiler can process an overall program for the chip and identify the hardware functions will occur at each time increment on chip 10 in order to execute the program. The compiler can parse the functions into operation schedules 18 for each hardware block 12 on the chip 10. The operation schedules 18 are then loaded onto the chip 10 and can be stored in a common chip 10 memory or operational schedules 10 can be distributed to local memories associated with respective hardware blocks 12.

In more detail, each hardware block 12 can include control circuitry 20, local memory 22, and one or more computational units 24. In implementations, the operation schedule 18 can be stored in the local memory 22 of the hardware block 12. The operational units 24 represent electrical circuitry configured to perform specific computations, e.g., addition, subtraction, multiplication, logical operations, etc. The control circuitry 20 can be configured to read and execute the operations of the operation schedule 18. For example, the control circuitry 20 can include control elements such as multiplexers and flip flops that route data between memory 22, input buffers or busses 16 and appropriate computations units 24 to execute the scheduled operations. As noted above, the operational schedule 18 can serve as a series of timers that trigger the control circuitry 20 to begin the execution of specific functions at specific counter values. Thus, the operation schedule 18 can trigger the control elements of the control circuitry 20 to route data within the hardware block 12 to appropriate computation units 24 in order to execute a scheduled operation at the scheduled time. For example, referring to "Schedule C", at counter time 030 the operational schedule 18 may trigger the control circuitry 20 to route data from memory 22 to an appropriate computational unit 24 to execute operation 3 ("Op. 3"), for example, a summation operation. At counter time 043, the operational schedule 18 would trigger the control circuitry to route the output data of the summation operation to the bus 16 to transmit the output data to another hardware block 12.

In some implementations, the operational schedules 18 are compressed to save memory resources. In such implementation, the hardware block 12 or other circuitry on the chip can decompress a portion of the operational schedule 18 prior to that portion of the operational schedule being executed. For example, operational schedules 18 can be compressed to take advantage of periodicities in the schedule. For instance, a particular schedule may include a set of operations scheduled on different phases of a six-cycle period. The schedule can be implemented, then, as a combination of periodic counters and delays (e.g., for phase).

Figure 2A:
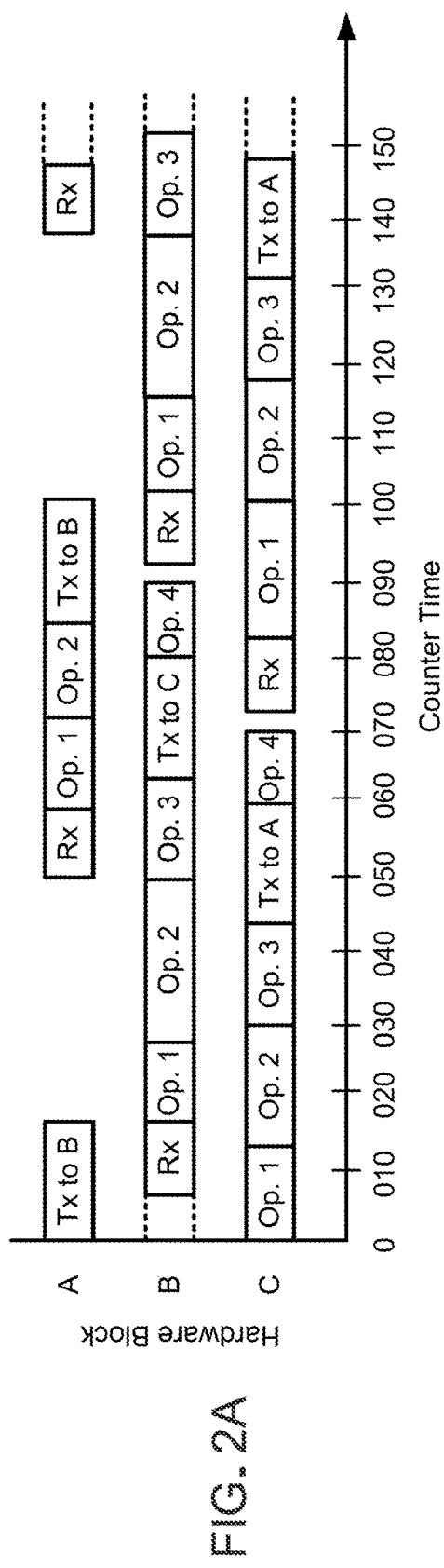
FIG. 2A is a timing diagram that illustrates example coordinated operations between operation schedules for hardware blocks of the integrated circuit device of FIG. 1.

FIG. 2A is a timing diagram that illustrates example coordinated operations between operation schedules for hardware blocks 12 of the integrated circuit chip 10 of FIG. 1. Specifically, the timing diagram illustrates how the operational schedules for hardware blocks A, B, and C are coordinated such that data transfer operations are synchronized between transmitting and receiving hardware blocks. For example, with reference to counter times 001-015, hardware block B is scheduled to receive data from hardware block A within a predetermined number of clock cycles from when hardware block A transmits the data. Specifically, at counter time 001, hardware block A begins transmitting data 30 (in FIG. 2B) to hardware block B, in accordance with hardware block A's operational schedule. Between counter times 001 and 006 hardware block A prepares and begins transmitting the data 30. At time 006 the data begins arriving at hardware block B, which is the pre-schedule counter time (on hardware block B's operational schedule when hardware block B begins to access the data. From time 006 to time 015 data is propagated from hardware block A to hardware block B, and hardware block B. Furthermore, the operations schedules of hardware block A and hardware block B can be coordinated such that the data received by hardware block B during counter times 001-0015 is data that hardware block B will use during one or more of the subsequent operations (e.g., Op. 1 through Op. 3) that hardware block B is pre-scheduled to perform during counter times 016-062.

In some implementations, the data transmission path between hardware blocks A and B may include some non-negligible amount of latency variation (e.g., variation in data transmission time) between a time when hardware block A transmits the data and a time when hardware block B receives the data. To account for such delay, the a portion of the time between when hardware block A begins transmission and when hardware block B begins to access the data may include a pre-determined delay period to ensure that the data has arrived at hardware block B at or before hardware block B begins accessing the data. Hardware block B (and any or all of the hardware blocks) can include an input buffer to collect the data as it is received so that if the data arrives at hardware block B one or more counter cycles early (e.g., due to latency variations), the data is not lost but is immediately available when hardware block B begins its pre-scheduled receiving operation to access the data from the buffer.

Pre-scheduled data transmission operations are performed in a similar manner between hardware block B and hardware block C, and between hardware block C and hardware block A. For example, with reference to counter times 063-082, hardware block C is scheduled to receive data from hardware block B with a predetermined number of clock cycles from when hardware block B transmits the data. Likewise, with reference to counter times 131-148, hardware block A is scheduled to receive data from hardware block C with a predetermined number of clock cycles from when hardware block C transmits the data.

Figure 2B:
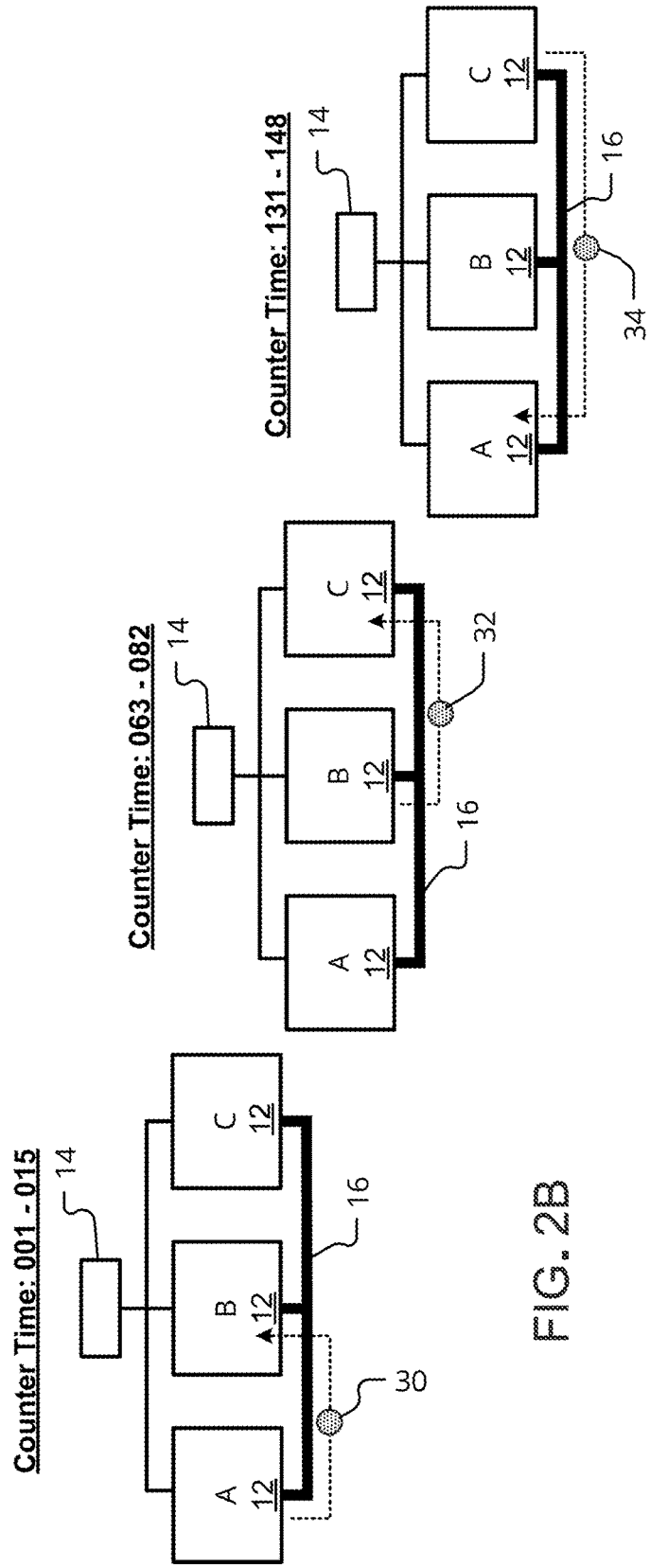
FIG. 2B depicts a series of diagrams that illustrate an example data flow within the integrated circuit device of FIG. 1 during execution of the operation schedules.

FIG. 2B depicts a series of diagrams that illustrate an example data flow within the integrated circuit chip 10 of FIG. 1 during execution of the operation schedules 18. This series of operations can represent a simplified flow of activation data 30 of a neural network. The activation data 30 is received by a communion interface (e.g., hardware block A). The communication interface (hardware block A) transfers the activation data 30 to an input layer of a neural network (e.g., hardware block B) at counter time 001-015. Between counter times 015 and 062, the input layer (hardware block B) performs three scheduled operations on the data. Then, beginning at counter time 063, the input layer (hardware block B) transmits its output data 32 to an output layer (e.g., hardware block C). The output layer (hardware block C) performs three scheduled operations on the output data 32 from the input layer (hardware block B) between counter times 83 and 130. Finally, beginning at counter time 131 the output layer (hardware block C) transmits its output 34 back to the communication interface (hardware block A), e.g., to be transmitted to another chip or other external resource. Furthermore, the series of diagrams in FIG. 2B illustrates how the coordinated operation schedules 18 of the three hardware blocks 12 can be used to manage access to a shared resource such as the data bus 16. Each data transfer that uses the data bus 16 is pre-scheduled for a known available time. Furthermore, because the operations of the data blocks are pre-scheduled and deterministic, errors involving shared resources should be minimized.

Although the use of operation schedules has been described in reference to controlling the operations of a single chip, a similar process can be applied to a system of individual chips. That is, individual operational schedules can be generated, in a similar manner, to control the simultaneous operations of a set of synchronized chips. For example, for a system of chips with synchronized counters, each chip can execute operations according to an explicit schedule of operations.

Figure 3:
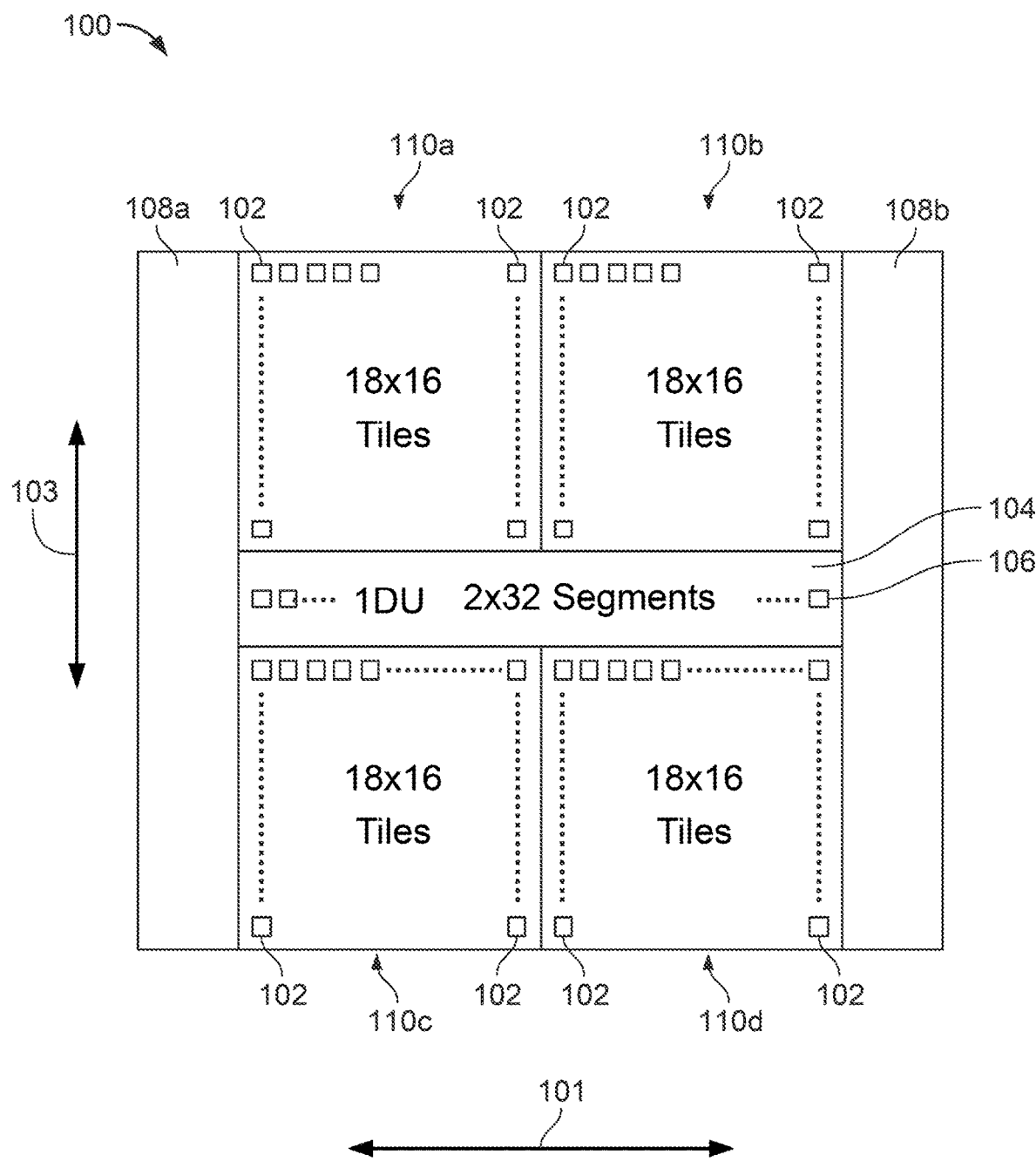
FIG. 3 is a schematic that illustrates an example of special purpose logic circuitry that can be configured to operate according to scheduled operations.

FIG. 3 is a schematic that illustrates an example of special purpose logic circuitry that can be configured to operate according to scheduled operations, in particular, an ASIC 100. The ASIC 100 includes various different types of hardware blocks that can be configured to execute the overall operations of the ASIC 100 according to individual operation schedules. Example hardware blocks that can operate according to individual operation schedules include tiles 102, vector processing unit 104, and communication interface 108.

More specifically, the ASIC 100 includes multiple tiles 102, in which one or more of the tiles 102 includes special purpose circuitry configured to perform operations, such as e.g., multiplication and addition operations. In particular, each tile 102 can include a computational array of cells (e.g., similar to the computational units 24 of FIG. 1), in which each cell is configured to perform mathematical operations (see, e.g., the exemplary tile 200 shown in FIG. 4, and described herein). In some implementations, the tiles 102 are arranged in a grid pattern, with tiles 102 arranged along a first dimension 101 (e.g., rows) and along a second dimension 103 (e.g., columns). For instance, in the example shown in FIG. 3, the tiles 102 are divided into four different sections (110a, 110b, 110c, 110d), each section containing 288 tiles arranged in a grid of 18 tiles down by 16 tiles across. In some implementations, the ASIC 100 shown in FIG. 3 may be understood as including a single systolic array of cells subdivided/arranged into separate tiles, in which each tile includes a subset/sub-array of cells, local memory and bus lines (see, e.g., FIG. 4).

The ASIC 100 may also include a vector processing unit 104. The vector processing unit 104 includes circuitry configured to receive outputs from the tiles 102 and compute vector computation output values based on the outputs received from the tiles 102. For example, in some implementations, the vector processing unit 104 includes circuitry (e.g., multiply circuitry, adder circuitry, shifters, and/or memory) configured to perform accumulation operations on the outputs received from the tiles 102. Alternatively, or in addition, the vector processing unit 104 includes circuitry configured to apply a non-linear function to the outputs of the tiles 102. Alternatively, or in addition, the vector processing unit 104 generates normalized values, pooled values, or both. The vector computation outputs of the vector processing units can be stored in one or more tiles. For example, the vector computation outputs can be stored in memory uniquely associated with a tile 102. Alternatively, or in addition, the vector computation outputs of the vector processing unit 104 can be transferred to a circuit external to the ASIC 100, e.g., as an output of a computation. Furthermore, the operations of the individual operation schedules for the tiles 102 and the vector processing unit 104 coordinate the transfer of the tile outputs to the vector processing unit 104.

In some implementations, the vector processing unit 104 is segmented, such that each segment includes circuitry configured to receive outputs from a corresponding collection of tiles 102 and computes vector computation outputs based on the received outputs. For instance, in the example shown in FIG. 3, the vector processing unit 104 includes two rows spanning along the first dimension 101, each of the rows including 32 segments 106 arranged in 32 columns. Each segment 106 includes circuitry (e.g., multiply circuitry, adder circuitry, shifters, and/or memory) configured to perform a vector computation, as explained herein, based on outputs (e.g., an accumulated sum) from a corresponding column of tiles 102. The vector processing unit 104 can be positioned in the middle of the grid of tiles 102 as shown in FIG. 3. Other positional arrangements of the vector processing unit 104 are also possible.

The ASIC 100 also includes a communication interface 108 (e.g., interfaces 1010A, 1010B). The communication interface 108 includes one or more sets of serializer/deserializer (SerDes) interfaces and a general purpose input/output (GPIO) interface. The SerDes interface is configured to receive instructions (e.g., operation schedules for the individual hardware blocks of the ASIC 100) and/or input data for the ASIC 100 and to output data from the ASIC 100 to an external circuit. For example, the SerDes interface can be configured to transmit and receive data (e.g., operation schedules and/or input/output data) at a rate of 32 Gbps, 56 Gbps, or any suitable data rate over the set of SerDes interfaces included within the communications interface 108. For example, the ASIC 100 may run a boot program when it is turned on. The GPIO interface may be used to load operation schedules onto the ASIC 100 for executing a particular type of machine learning model.

The ASIC 100 may communicate with external circuits or systems that do not operate according to specific operation schedules like the ASIC. For example, operations of external systems may not be completely synchronous with the operations of the ASIC 100. Alternatively or in addition, data communications with external circuits and systems may be subject to irregular delays. Consequently, input data may arrive at the communication interface 108 at irregular intervals. Implementations can account for such potentially irregular communications by incorporating any one or more of the following features: including a First In First Out (FIFO) buffer in the ASIC 100, implementing scheduling operations of the communication interface 108 based on a bounded data arrival delay, implementing conditionally based alternate operations, implementing input data padding, or any combination thereof.

The communication interface 108 can include a FIFO buffer for receiving input data from external circuits/systems. For example, the FIFO buffer can be sufficiently large to temporarily store enough input data for a specified number of operation cycles of the ASIC 100, e.g., 100 cycles, 500 cycles, 1,000 cycles, or 10,000 cycles. For instance, if each operation cycle of the ASIC 100 relies on 1 kB of input data a FIFO buffer of 500 cycles would nominally be 500 kB.

In addition, the operations schedule for the communication interface 108 can be based on a bounded arrival delay of an expected external system or a specific external system from which the ASIC 100 is or will be receiving input data. For example, the expected communications latency for an external system can be estimated and then bounded based on additional information such as operational variations of the external system. The communication interface 108 can be scheduled to access input data from the FIFO buffer at the latest expected arrival delay for the external system. For example, the communication interface 108 can operate according to an operation schedule that instructs the communication interface 108 to access data from the FIFO buffer at a time interval corresponding with the latest expected arrival delay for the external system. Assuming the external system sends input data at regular or relatively regular time intervals, checking the FIFO buffer at the latest expected arrival delay for the external system would provide a reasonable assurance that input data is available for processing during each cycle of the ASIC 100, e.g., at least during normal operations.

In some implementations, the communication interface 108 can be scheduled to check the FIFO buffer for input data at the latest expected arrival delay for the external system, and to execute alternate scheduled operations if no data is present. For example, if no input data is present in the FIFO buffer, the communication interface 108 can trigger a suspend mode for the ASIC 100. The communication interface 108 can signal other hardware blocks, e.g., tiles 102, to execute an alternate delay schedule. The delay schedule can include a series of no-op instructions for a specified delay period. The delay period for each hardware block may be different (e.g., include a different number of no-op instructions), so as to properly coordinate operations between the hardware blocks when the suspend mode ends and normal operations resume. In some implementations, the suspend mode can be triggered if input data in the FIFO buffer drops below a threshold value. For example, the threshold value can be a percentage of the FIFO buffer capacity, e.g., 5%, 10%, 20%, etc.

In some implementations, the data in the FIFO buffer can be padded if the buffer is empty or falls below a threshold value. For example, default data values can be added to any received input data to allow the ASIC 100 to continue operations for a cycle or a number of cycles when insufficient input data is available in the FIFO buffer. For example, the default data can include null values if the ASIC 100 is in an initialization period, e.g., prior to beginning normal operations. During the initialization period there may be a low risk that null data will adversely affect output values calculated by the ASIC 100.

Alternatively, the default values can be computed, e.g., based on prior ASIC output or based on an interpolation of prior input if padding is required during normal operations. For example, the communications interface 108 can be configured to store input data from the FIFO buffer as padding data before the buffer empties or to interpolate padding data from input data in the FIFO buffer. As another example, the communications interface 108 can be configured to signal a subset of other hardware blocks to execute an alternate operations schedule to provide default padding values if input data in the FIFO buffer falls below a threshold value. For example, the communication interface 108 can signal hardware blocks containing ASIC output data to send the output data to the communication interface 108 to be used as padding data.

The ASIC 100 further includes multiple controllable bus lines (see, e.g., FIG. 4) configured to convey data among the communications interface 108, the vector processing unit 104, and the multiple tiles 102. Controllable bus lines include, e.g., wires that extend along both the first dimension 101 (e.g., rows) of the grid and the second dimension 103 (e.g., columns) of the grid. A first subset of the controllable bus lines extending along the first dimension 101 can be configured to transfer data in a first direction (e.g., to the right of FIG. 3). A second subset of the controllable bus lines extending along the first dimension 101 can be configured to transfer data in a second direction (e.g., to the left of FIG. 3). A first subset of the controllable bus lines extending along the second dimension 103 can be configured to transfer data in a third direction (e.g. to the top of FIG. 3). A second subset of the controllable bus lines extending along the second dimension 103 can be configured to transfer data in a fourth direction (e.g., to the bottom of FIG. 3). As discussed above, the individual operation schedules of the different hardware blocks can coordinate access to shared resources such as the controllable bus lines to prevent communication errors within the ASIC 100.

Each controllable bus line includes multiple conveyer elements, such as flip-flops, that are used to convey data along the lines in accordance with a clock signal. Transferring data over a controllable bus line can include shifting, at each clock cycle, data from a first conveyer element of the controllable bus line to a second adjacent conveyer element of the controllable bus line. In some implementations, data is conveyed over the controllable bus lines upon the rising or falling edge of a clock cycle. For example, data present, at a first clock cycle, on a first conveyer element (e.g., a flip-flop) of a controllable bus line can be transferred to a second conveyor element (e.g., a flip-flop) of the controllable bus line at a second clock cycle. In some implementations, the conveyer elements can be periodically spaced apart at a fixed distance from one another. For example, in some cases, each controllable bus line includes multiple conveyer elements, with each conveyer element positioned within or proximate to a corresponding tile 102.

Each controllable bus line also includes multiple multiplexers and/or demultiplexers. A multiplexer/demultiplexer of a controllable bus line is configured to transfer data between the bus line and a component of the ASIC chip 100. For example, a multiplexer/demultiplexer of a controllable bus line can be configured to transfer data to and/or from a tile 102, to and/or from the vector processing unit 104, or to and/or from the communication interface 108. Transferring data among tiles 102, the vector processing unit 104, and the communication interface can be coordinated by the operation schedules. The operation schedules can coordinate which ASIC 100 hardware blocks are transmitting to or receiving data from the controllable at each counter. The operations scheduled at any given counter time may determine, e.g., what data is transferred from a source (e.g., memory within a tile 102 or a vector processing unit 104) to a controllable bus line or, alternatively, what data is transferred from the controllable bus line to a sink (e.g., memory within a tile 102 or a vector processing unit 104).

The controllable bus lines are configured to be controlled on a local level, such that each tile, vector processing unit, and/or communication interface includes its own set of control elements for manipulating the controllable bus lines passing through that tile, vector processing unit, and/or communication interface. For example, each tile, 1D vector processing unit, and communication interface may include a corresponding set of conveyor elements, multiplexers and/or demultiplexers for controlling data transfer to and from that tile, 1D vector processing unit, and communication interface. Accordingly, the operation schedule for each tile, 1D vector processing unit, and communication interface can trigger the respective hardware block to provide appropriate control signals to the its conveyer elements in order to route data in accordance with the scheduled operations.

To minimize latency associated with operations of the ASIC chip 100, the tiles 102 and vector processing unit 104 can be positioned to reduce the distance data travels among the various components. In a particular implementation, both the tiles 102 and communication interface 108 can be segregated into multiple sections, with both the tile sections and the communication interface sections being arranged such that the maximum distance data travels between a tile and a communication interface is reduced. For instance, in some implementations, a first group of tiles 102 can be arranged in a first section on a first side of the communications interface 108, and a second group of tiles 102 can be arranged in a second section on a second side of the communication interface. As a result, the distance from a communication interface to the furthest tile may be cut in half compared to a configuration in which all of the tiles 102 are arranged in a single section on one side of the communication interface.

Alternatively, the tiles may be arranged in a different number of sections, such as four sections. For instance, in the example shown in FIG. 3, the multiple tiles 102 of ASIC 100 are arranged in multiple sections 110 (110a, 110b, 110c, 110d). Each section 110 includes a similar number of tiles 102 arranged in a grid pattern (e.g., each section 110 can include 256 tiles arranged in 16 rows and 16 columns). The communication interface 108 also is divided into multiple sections: a first communication interface 1010A and a second communication interface 1010B arranged on either side of the sections 110 of tiles 102. The first communication interface 1010A can be coupled, through controllable bus lines, to the two tile sections 110a, 110c on the left side of the ASIC chip 100. The second communication interface 1010B can be coupled, through controllable bus lines, to the two tile sections 110b, 110d on the right side of the ASIC chip 100. As a result, the maximum distance data travels (and thus the latency associated with the data propagation) to and/or from a communication interface 108 can be halved compared to an arrangement in which only a single communication interface is available. Other coupling arrangements of the tiles 102 and communication interfaces 108 are also possible to reduce data latency. The coupling arrangement of the tiles 102 and communication interface 108 can be programmed by providing control signals to the conveyer elements and multiplexers of the controllable bus lines.

In some implementations, one or more tiles 102 are configured to initiate reading and writing operations with respect to controllable bus lines and/or other tiles within the ASIC 100 (referred to herein as "control tiles"). The remaining tiles within the ASIC 100 can be configured to perform computations based on the input data (e.g., to compute layer inferences). In some implementations, the control tiles include the same components and configuration as the other tiles within the ASIC 100. The control tiles can be added as an extra tile or tiles, an extra row or rows, or an extra column or columns of the ASIC 100. For example, for a symmetric grid of tiles 102, in which each tile 102 is configured to perform a computation on input data, one or more additional rows of control tiles can be included to handle reading and writing operations for the tiles 102 performing computations on the input data. For instance, each section 110 includes 18 rows of tiles, where the last two rows of tiles may include control tiles. Providing separate control tiles increases, in some implementations, the amount of memory available in the other tiles used to perform the computations. Providing separate control tiles also may aid in coordination of data transmission operations between operation schedules. For example, using control tiles to control reading and writing operations with respect to controllable bus lines and/or other tiles within the ASIC 100 may reduce the number of individual schedules that need to be checked for scheduling conflicts. In other words, if the operation schedules for the control tiles are coordinated to avoid "double booking" the use of a particular controllable bus line at the same counter time, then there is a reasonable assurance that communications errors will not occur on the controllable bus lines. Separate tiles dedicated to providing control as described herein are not necessary, however, and in some cases, no separate control tiles are provided. Rather, each tile may store in its local memory instructions for initiating reading and writing operations for that tile.

Furthermore, while each section 110 shown in FIG. 3 includes tiles arranged in 18 rows by 16 columns, the number of tiles 102 and their arrangement in a section can be different. For example, in some cases, the sections 110 may include an equal number of rows and columns.

Furthermore, although shown in FIG. 3 as divided into four sections, the tiles 102 can be divided into other different groupings. For example, in some implementations, the tiles 102 are grouped into two different sections, such as a first section above the vector processing unit 104 (e.g., nearer the top of the page shown in FIG. 3) and a second section below the vector processing unit 104 (e.g., nearer to the bottom of the page shown in FIG. 3). In such an arrangement, each section may contain, e.g., 596 tiles arranged in a grid of 18 tiles down (along direction 103) by 32 tiles across (along direction 101). Sections may contain other total numbers of tiles and may be arranged in different sized arrays. In some cases, the divisions between sections are delineated by hardware features of the ASIC 100. For example, as shown in FIG. 3, sections 110a, 110b may be separated from sections 110c, 110d by the vector processing unit 104.

As explained herein, in some implementations, one or more of the tiles 102 can be dedicated to storing the operation schedules 18. That is, the tiles 102 dedicated to storing operation schedules do not take part in performing calculations on input data such as weight inputs and activation inputs. For example, tiles 102 dedicated to storing operation schedules can store the individual operation schedules for multiple tiles 102 (e.g., neighboring tiles 102). The tiles 102 dedicated to storing operation schedules can decompress and provide relevant portions of each tile's operating schedule at various intervals during the execution of a program by the ASIC 100. For instance, a tile 102 dedicated to storing operation schedules can tiles 102 respective first portions of their operation schedule covering a first operating time frame (e.g., counter times 000000_hex through 000FFF_hex) at the start of the program and subsequent portions of their operation schedule covering a subsequent operating time frame iteratively before the counter reaches the subsequent time frames. Alternatively, as disclosed herein, dedicated control tiles are not used. Rather, in such cases, the local memory of each tile stores the operation schedule for that particular tile.

Figure 4:
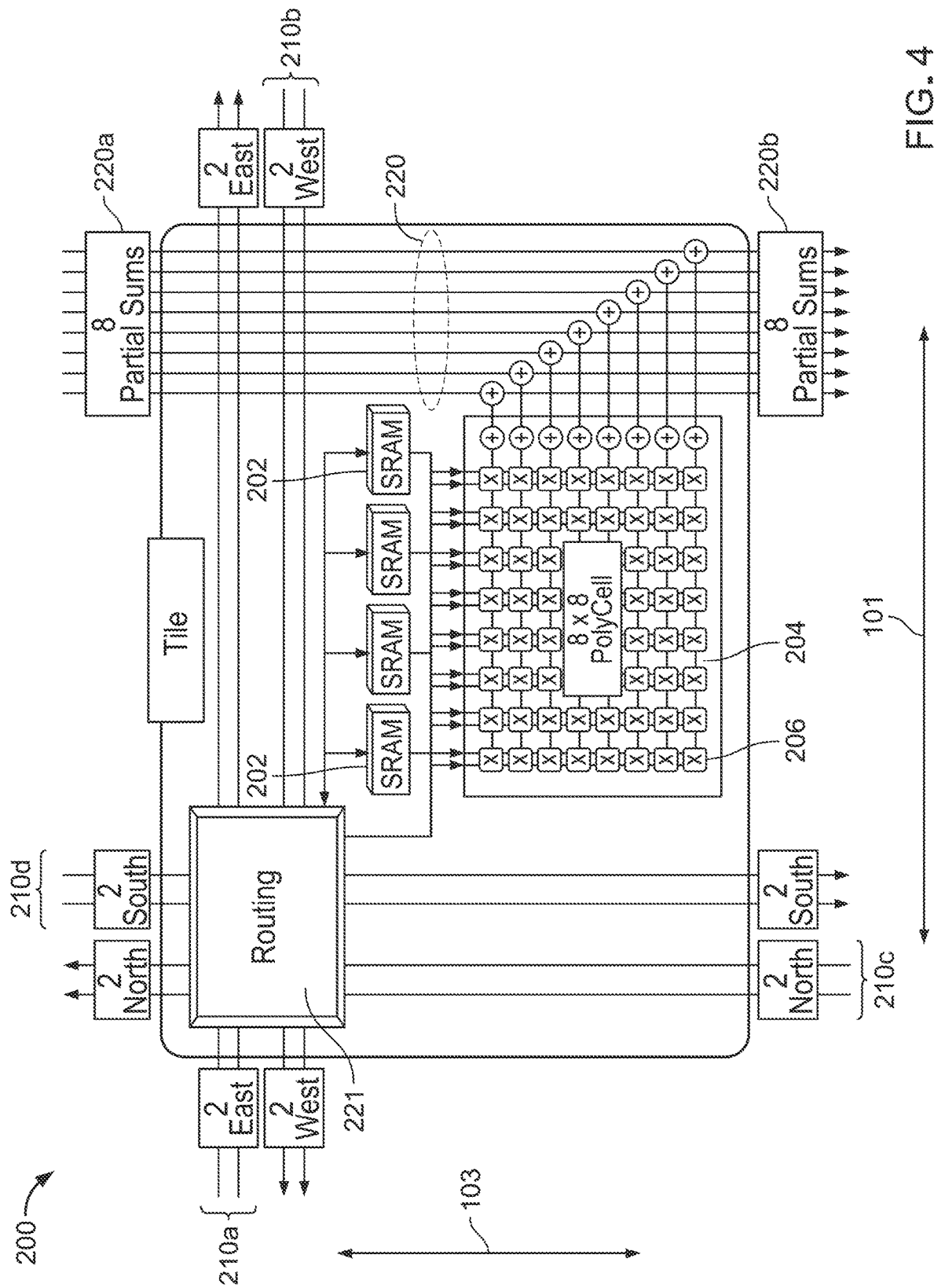
FIG. 4 is a schematic that illustrates an example of a tile for use in the ASIC chip of FIG. 3.

A schematic illustrating an example of a tile 200 for use in the ASIC chip 100 is shown in FIG. 4. Each tile 200 includes local memory 202 and a computational array 204 coupled to the memory 202. The local memory 202 includes physical memory positioned proximate to the computational array 204. The computational array 204 includes multiple cells 206. Each cell 206 of the computational array 204 includes circuitry configured to perform a computation (e.g., a multiply and accumulate operation) based on data inputs, such as activation inputs and weight inputs, to the cell 206. Each cell can perform the computation (e.g., the multiply and accumulation operation) on a cycle of the clock signal. The computational array 204 can have more rows than columns, more columns than rows, or an equal number of columns and rows. For instance, in the example shown in FIG. 4, the computational array 204 includes 64 cells arranged in 8 rows and 8 columns. Other computational array sizes are also possible, such as computational arrays having 16 cells, 32 cells, 128 cells, or 256 cells, among others. Each tile can include the same number of cells and/or the same size computational array. The total number of operations that can be performed in parallel for the ASIC chip then depends on the total number of tiles having the same size computational array within the chip. For example, for the ASIC chip 100 shown in FIG. 3, which contains approximately 1150 tiles, this means that approximately 92,000 computations can be performed in parallel every cycle. Examples of clock speeds that may be used include, but are not limited to, 225 MHz, 500 MHz, 950 MHz, 1 GHz, 1.25 GHz, 1.5 GHz, 1.95 GHz, or 2 GHz. The computational arrays 204 of each individual tile is a subset of the larger systolic array of tiles, as illustrated in FIG. 3.

The memory 202 contained in the tile 200 can include, e.g., random-access memory (RAM), such as SRAM. Other memory can be used instead. Each memory 202 can be configured to store $(1/n)^{th}$ of the total memory associated with n tiles 102 of the ASIC chip. The memory 202 can provided as a single chip or in multiple chips. For example, memory 202 shown in FIG. 4 is provided as four single-port SRAMs, each of which is coupled to the computational array 204. Alternatively, the memory 202 can be provided as two single-port SRAMs or eight single-port SRAMS, among other configurations. The joint capacity of the memory can be, but is not limited to, e.g., 16 kB, 32 kB, 64 kB, or 128 kB, after error correction coding. By providing the physical memory 202 locally to the computational arrays, the density of wiring for the ASIC 100 can be, in some implementations, vastly reduced. In an alternate configuration in which memory is centralized within the ASIC 100, as opposed to provided locally as described herein, may require a wire for each bit of memory bandwidth. The total number of wires needed to cover each tile of the ASIC 100 would far exceed the available space within the ASIC 100. In contrast, with dedicated memory provided for each tile, the total number of required to span the area of the ASIC 100 can be substantially reduced.

The tile 200 also includes controllable bus lines. The controllable bus lines may be categorized into multiple different groups. For example, the controllable bus lines can include a first group of general purpose controllable bus lines 210 configured to transfer data among tiles in each cardinal direction. That is, the first group of controllable bus lines 210 can include: bus lines 210a configured to transfer data toward a first direction along the first dimension 101 of the grid of tiles (referred to as "East" in FIG. 4); bus lines 210b configured to transfer data toward a second direction along the first dimension 101 of the grid of tiles (referred to as "West" in FIG. 4), in which the second direction is opposite to that of the first direction; bus lines 210c configured to transfer data toward a third direction along the second dimension 103 of the grid of tiles (referred to as "North" in FIG. 4); and bus lines 210d configured to transfer data toward a fourth direction along the second dimension 103 of the grid of tiles (referred to as "South" in FIG. 4), in which the fourth direction is opposite to the third direction. General purpose bus lines 210 can be configured to carry control data, activation input data, data from and/or to the communications interface, data from and/or to the vector processing unit, and data to be stored and/or used by the tile 200 (e.g., weight inputs). The tile 200 may include one or more control elements 221 (e.g., flip-flops and multiplexers) for controlling the controllable bus lines, and thus routing data to and/or from the tile 200 and/or from memory 202.

The controllable bus lines also can include a second group of controllable bus lines, referred to herein as computational array partial sum bus lines 220. The computational array partial sum bus lines 220 can be configured to carry data output from computations performed by the computational array 204. For example, the bus lines 220 can be configured to carry partial sum data obtained from the rows in the computational array 204, as shown in FIG. 4. In such case, the number of bus lines 220 would match the number of rows in the array 204. For instance, for a 8×8 computational array, there would be 8 partial sum bus lines 220, each of which is coupled to the output of a corresponding row in the computational array 204. The computational array output bus lines 220 can be further configured to couple to another tile within the ASIC chip, e.g., as inputs to a computational array of another tile within the ASIC chip. For example, the array partial sum bus lines 220 of tile 200 can be configured to receive inputs (e.g., partial sums 220a) of a computational array of a second tile that is located at least one tile away from the tile 200. The outputs of computational array 204 then are added to the partial sum lines 220 to produce new partial sums 220b, which may be output from the tile 200. The partial sums 220b then may be passed to another tile or, alternatively, to the vector processing unit. For example, each bus line 220 may be coupled to a corresponding segment (such as segments 106 in FIG. 3) of the vector processing unit.

As explained with respect to FIG. 3, the controllable bus lines can include circuitry such as conveyer elements (e.g., flip-flops) configured to allow data to be conveyed along the bus lines. In some implementations, each controllable bus line includes, for each tile, a corresponding conveyer element. As further explained with respect to FIG. 3, the controllable bus lines can include circuitry such as multiplexers configured to allow data to be transferred among the different tiles, the vector processing unit and the communications interface of the ASIC chip. The multiplexers can be located wherever there is a source or sink for data. For example, in some implementations, as shown in FIG. 4, control circuitry 221, such as multiplexers, can be located at crossings of controllable bus line (e.g., at the crossing of general purpose bus lines 210a and 210d, at the crossing of general purpose bus lines 210a and 210c, at the crossing of general purpose bus lines 210b and 210d, and/or at the crossing of general purpose bus lines 210b and 210c). The multiplexers at the bus line crossings can be configured to transfer data between the bus lines at the crossings. Furthermore, as explained in reference to FIG. 1, the control circuitry 221 can be configured to execute the tile's individual operation schedule. For example, control circuitry 221 can execute the operations of the operation schedule by routing data to appropriate components within the tile 102 (e.g., routing activation data or layer weights to/from SRAM 202 to appropriate cells 206 in the computational array 204) or routing output data and input data to/from the controllable bus lines.

FIGS. 5A-11B are schematics that illustrate an example process in which the ASIC 100 is used as a hardware accelerator for computing neural network inferences. FIGS. 5A, 6A, 7A, 8A, 9, 10A and 11A are schematics that illustrate an overview of data flow through the ASIC 100 at different times in the process. FIGS. 5B, 6B, 7B, 8B, 10B and 11B are schematics that illustrate data flow within a single tile (e.g., a control tile or other tile 102) of the ASIC 100 at the times associated with FIGS. 5A, 6A, 7A, 8A, 10A and 11A, respectively. The ellipses in FIGS. 5A-11B indicate the presence of repeating features that are not shown in the figures. A compass 300 is provided in each of FIGS. 5A-11B to provide orientation for data flow. The labels "N," "W," "S" and "E" do not correspond to actual geographic directions, but instead are used to indicate different relative directions in which data can flow through the grid. Controllable bus lines conveying data in the directions indicated by the labels "N," "W," "S" and "E" are referred to herein as north-flowing bus lines, west-flowing bus lines, south-flowing bus lines, and east-flowing bus lines.

The arrangement of tiles 102 and vector processing unit 104 in FIGS. 5A-11A is similar to the arrangement shown in FIG. 3. For example, half of the tiles 102 can be arranged on a first side of the vector processing unit 104 and the other half of tiles 102 can be arranged on a second opposite side of the vector processing unit 104. The communication interfaces 108 are shown in FIGS. 5A-11A as arranged on entirely on the right side of the tile grid, but can be positioned on either side of the tile grid as depicted in the schematic of FIG. 3.

Figures 5A, 5B:
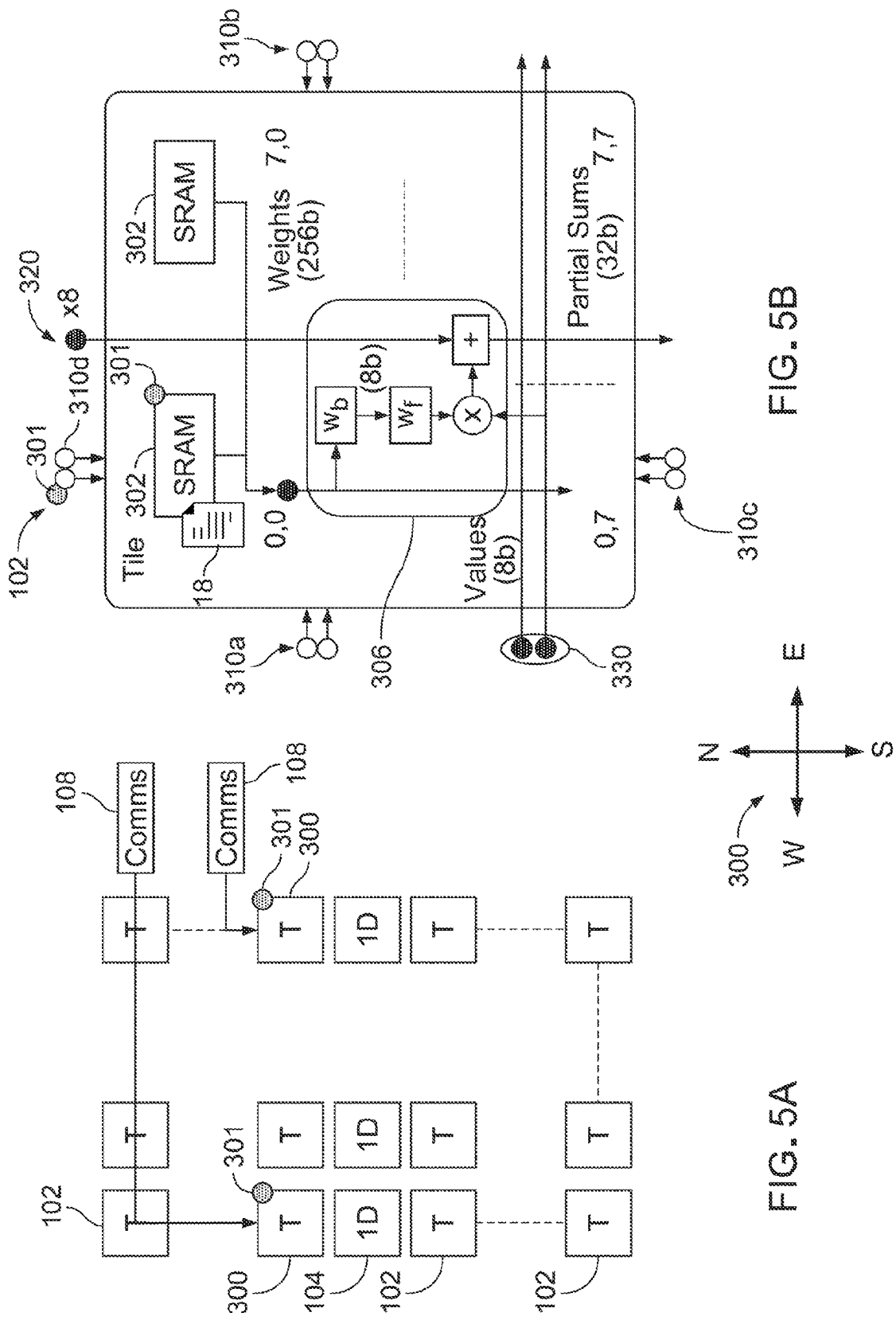
FIGS. 5A, 6A, 7A, 8A, 9, 10A and 11A are schematics that illustrate an overview of a data flow through an ASIC at different times in an exemplary process implemented by the ASIC.
FIGS. 5B, 6B, 7B, 8B, 10B and 11B are schematics that illustrate detail of data flow within a single tile of an ASIC at the times associated with FIGS. 5A, 6A, 7A, 8A, 10A and 11A, respectively.

In a first step, as shown in FIG. 5A, input values (e.g., activation inputs and/or weight inputs) for a first layer of a model (e.g., a neural network model) are loaded from the communication interfaces 108 onto one or more tiles 102 (e.g., all of the tiles 102) within the ASIC 100. That is, in accordance with the respective operation schedules 18 the communication interfaces 108 read external input data (e.g., activation inputs and/or layer weights and transmit the data to the controllable bus lines. From the communications interfaces 108, the input values follow a data path along the controllable bus lines (e.g., such as the general purpose controllable bus lines described herein) to the one or more control tiles. The data can be transferred between different bus lines through the use of multiplexers at locations where the different bus lines cross (e.g., see routing element 221 in FIG. 4). For example, as shown in FIG. 5A, the input data flows along a data path that entails traveling on west-flowing general purpose controllable bus lines and then on south-flowing general purpose controllable bus lines. The input data can be transferred from the west-flowing bus lines to the south-flowing bus lines through the use of multiplexers at locations where the west-flowing bus lines and south-flowing bus lines cross. In some implementations, the weight inputs for a second inference can be loaded to the one or more control tiles while a previous first inference is being executed by the ASIC 100. In other words, the operation schedules of the control tiles are coordinated with those of the other tiles 102 that are computing the inference, such that at the same counter times that the other tiles 102 are computing a first inference, the control tiles 102 are preparing new activation data and/or weights for the next inference to be sent to the other tiles 102 for computation of the next inference.

FIG. 5B is a schematic that illustrates a detailed view of an example of a tile 102, from the ASIC 100. As shown in FIG. 5B, the tile 102 can include memory 302 on which the input values are stored. Memory 302 can include any suitable memory as described herein with respect to FIG. 4. As discussed above, the memory 302 can be used to store the tile's individual operation schedule 18 (or portions thereof in implementations that employ dedicated tiles 102 for storing operation schedules). The input values are obtained from one or more south-flowing general purpose controllable bus lines 310d that pass adjacent to or through the tile 102. The data from the south-flowing controllable bus lines 310d can be transferred to the memory 302 through the use of a multiplexer. Other general purpose controllable bus lines (310a, 310b, 310c) are not used during this step.

Tile 102 also includes a computational array of cells 306 directly coupled to memory 302. As explained herein, the computational array of cells 306 may be a subset of a larger systolic array of cells that makes up the tiles of the ASIC. The cells 306 are arranged in an array, with a single cell 306 shown in FIG. 5B at a position (i, j)=(0, 0), where the parameter i represents a cell row position within the array and j represents a cell column position in the array. In the example shown in FIG. 5B, the computational array has 8 rows and 8 columns, though other sizes also are possible. Each cell 306 of the computational array can include circuitry configured to perform computations based on data received at the tile. For example, each cell 306 can include multiplier circuitry, adder circuitry, and one or more registers. The output of each cell 306 can be passed as a partial sum to an adjacent cell within the computational array or to a cell within a computational array of another tile in the ASIC 100. The computational array of cells 306 is used in later steps.

The tile 102 also includes controllable bus lines 320 for providing data from previous tiles. For example, the controllable bus lines 320 can carry partial sum output data obtained from a computational array of a previous tile in the ASIC 100 and provide the partial sum output data as an input to the cells of the computational array within tile 102. Controllable bus lines 320 are not used in this step.

The tile 102 also includes controllable bus lines 330 for providing activation input values as an input to the cells 306 of the computational array. For example, the activation input values can be provided to multiplier circuitry within the cell 306. The activation input values can be obtained from the communications interface 108 or from cells within another tile in the ASIC 100. The data from the controllable bus lines 330 can be transferred to the cells 306 through the use of a multiplexer. Controllable bus lines 330 are not used in the example step depicted in FI GS. 5A-5B.

As explained herein, in some implementations, one or more tiles 102 are dedicated to storing operation schedules 18 and/or output information from the vector processing unit 104. In some implementations, the computational arrays within the one or more control tiles may not be used to perform computations. Alternatively, the one or more control tiles can be configured to store operation schedules 18 in addition to performing computations on input data, such as received weight inputs and activation values. In some implementations, the weight inputs are loaded into the memory of each tile 102 where the weight inputs will be used, without first storing the weight inputs in a subset of one or more control tiles.

Figures 6A, 6B:
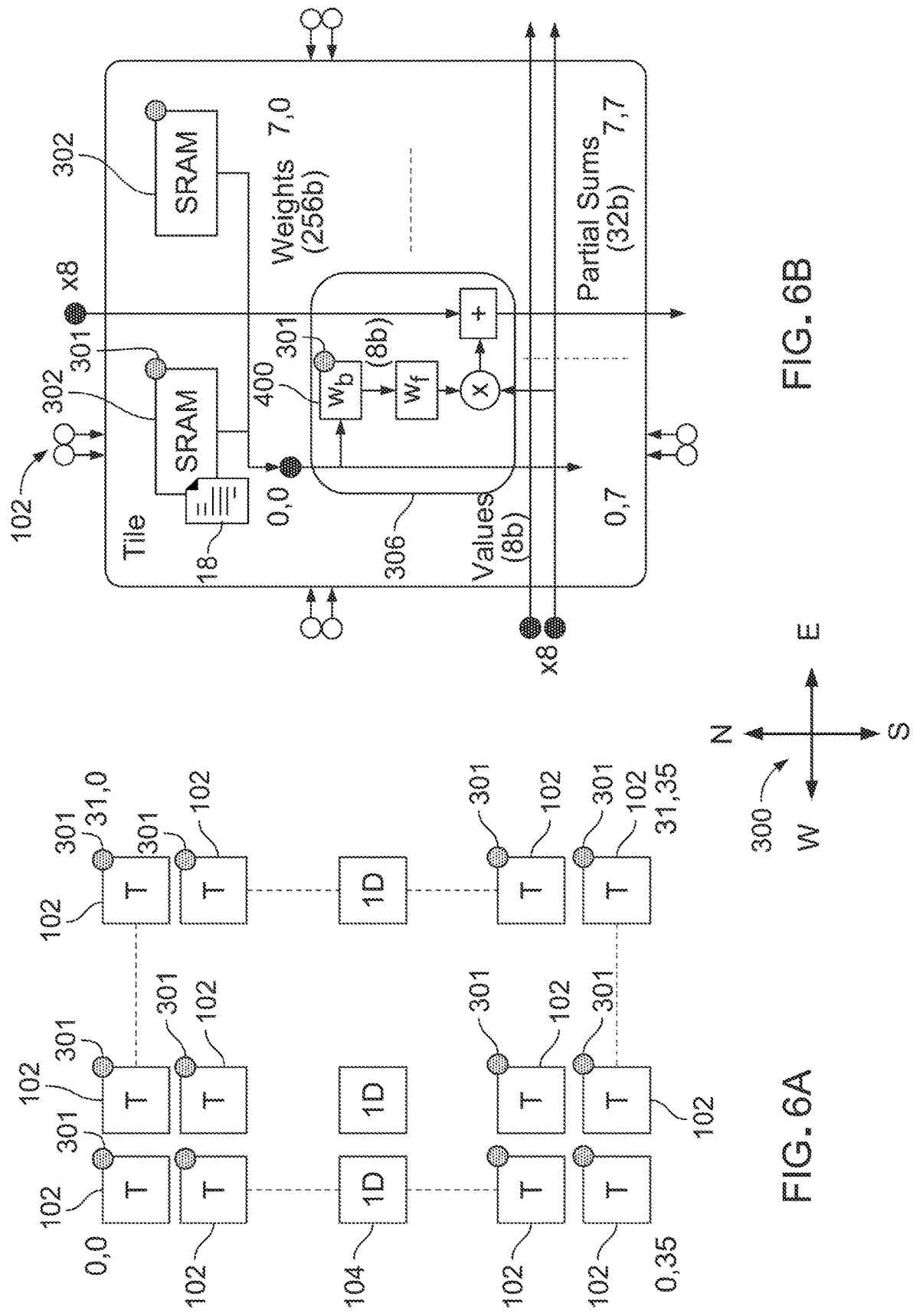

In a second step, as shown in FIG. 6A, at the scheduled counter value, weight inputs 301 are loaded into the individual cells 306 of the computational arrays within the tiles 102. Loading the weight inputs 301 into the individual cells 306 can include transferring the data from the memory of one or more control tiles to the corresponding tiles 102 in which the weight inputs 301 belong. The weight inputs 301 can be conveyed along the general purpose controllable bus lines to the tiles 102 and transferred to the memory through multiplexers coupled to the bus lines and memory. FIG. 6B is a detailed view of an example of a tile 102. The weight inputs 301 can be stored in the memory 302 for the duration of the model execution, which may include computation of multiple inferences. As an alternative to loading the weight inputs 301 from the one or more control tiles, the weight inputs 301 may have been pre-loaded into the memory of tiles 102 directly from the communication interfaces 108. To prepare a model for execution, the weight inputs 301, for each tile 102, can be loaded from the memory 302 of the tile 102 into each cell 306 of the computational array within that tile 102. For example, the weight inputs 301 can be loaded into a register 400 (also referred to as a "back register") within the cell 306. The use of back registers allows a computation to be performed by the cell 306 on a current weight input while a next weight input is loaded into the back register. Although loading weight registers is shown for only one cell 306 in FIG. 6B, weight registers of other cells within the computational array also can be loaded during this step.

Figures 7A, 7B:
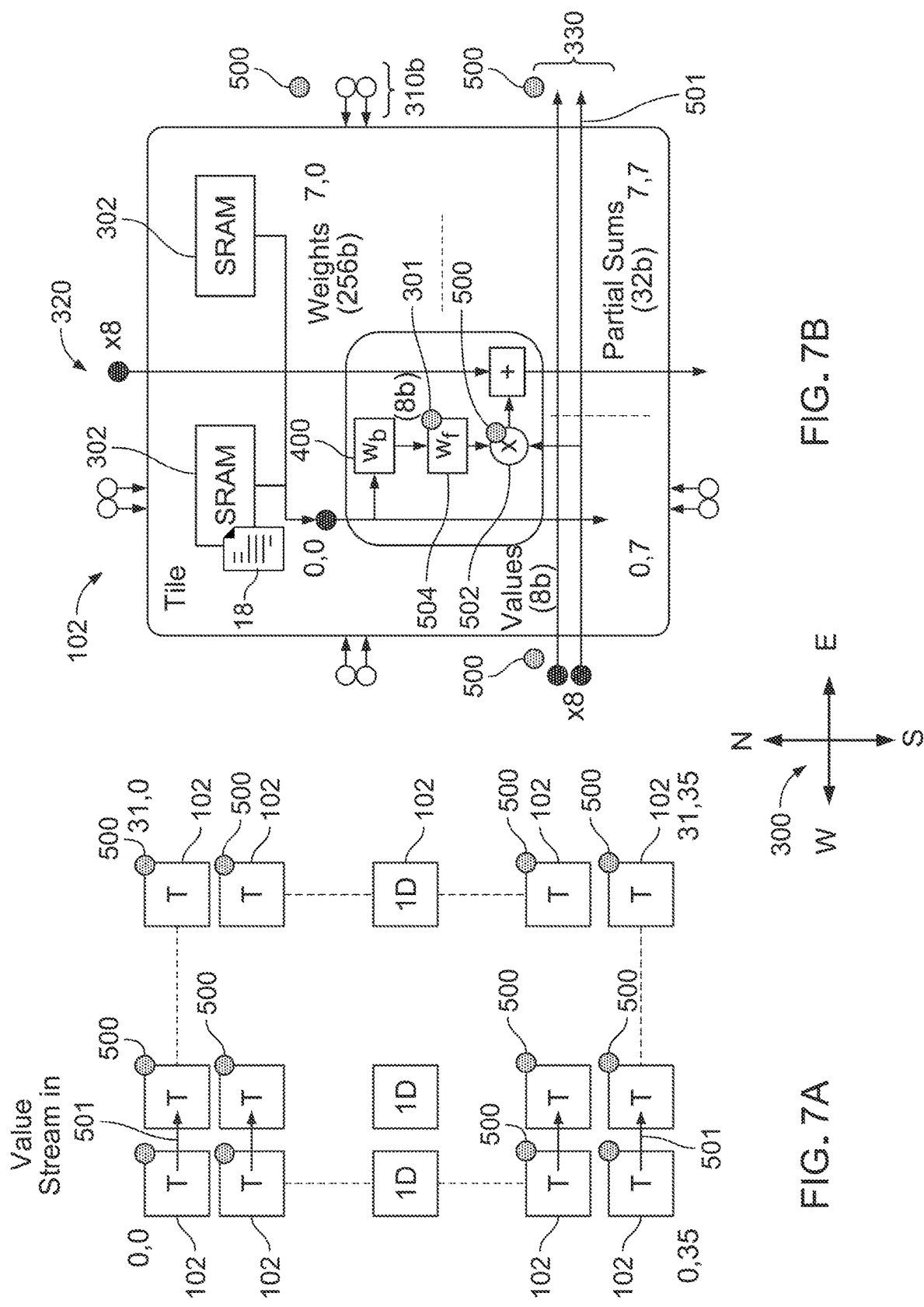

In a third step, as shown in FIG. 7A, at the scheduled counter value, activation values 500 are introduced into the tiles 102 and may be stored within memory 302 there. The activation values 500 can be transferred over multiple clock cycles. Computations then are performed by the computational arrays of each tile 102 with the received activation values 500 and the weight inputs 301 from the memory 302 in the tile 102. For example, the computation can include multiplying an activation value by a weight input and then summing the result with the product of a different weight input and activation value. In some implementations, the activation values 500 are conveyed to and between tiles 102 on controllable bus lines 330. Each of the controllable bus lines 330 can extend along a same direction. For example, as shown in FIG. 7B, the controllable bus lines 330 extend laterally along a grid dimension that is orthogonal to a grid dimension along which controllable bus lines 320 extend. Furthermore, as indicated by the arrows 501 in FIG. 7A, and the arrows 501 on controllable bus lines 330 in FIG. 7B, the activation input data 500 travels on the bus lines 330 in the same (e.g., east-flowing) direction. Alternatively, in some implementations, some of the activation input values 500 travel on some of the controllable bus lines 330 in a first direction (e.g., east-flowing direction) and some other activation input values 500 travel on some other controllable bus lines 330 in a second opposite direction (e.g., west-flowing direction).

In some implementations, the number of controllable bus lines 330 that extend through each tile 102 is determined by the size of the computational array. For example, the number of controllable bus lines 330 that extend through each tile 102 may be equal to at least the number of rows of cells within the computational array. In the example shown in FIG. 7B, there are 8 controllable bus lines 330 that pass through tile 102 given that there are 8 rows of cells 306 within the computational array of tile 102. In some implementations, each separate controllable bus line 330 transfers activation input values 500 to the cells 306 within a corresponding row of the computational array. For instance, for an 8×8 computational array of cells 306 within a tile 102, a first controllable bus line 330 transfers activation input values 500 to the cells 306 within a first row of the array, a second controllable bus line 330 transfers activation input values 500 to the cells 306 within a second row of the array, etc., up to the last controllable bus line 330, which transfers activation input values 500 to the cells 306 within the last row of the array. Additional controllable bus lines (e.g., partial sum bus lines) may pass through each tile to provide partial sums from another tile, to receive and combine results of computations within the tile to the provided partial sums, and to output the new partial sums to a new tile or to the vector processing unit.

In some implementations, the controllable bus lines 330 transfer the activation input values 500 to circuitry configured to perform a computation within the cell 306. For example, as shown in FIG. 7B, the controllable bus lines 330 are configured to transfer activation input values 500 to multiplier circuit 502 within the cell 306. The activation input values 500 can be transferred to the multiplier circuit 502 through the use of multiplexers on the controllable bus lines 330.

In some implementations, once the activation input values 500 and weight input values 301 are determined to be in place (e.g., after the predetermined number of counter cycles required to perform the loading operations), the cells 306 of the computational array within the tile 102 perform a computation using the received activation input values 500 and the weight input values 301 from the memory 302 in the tile 102. For example, as shown in FIG. 7B, the weight input values 301 that were previously stored in register 400 are transferred to register 504 (also referred to as a "front register"). Then, using the multiplier circuit 502, the weight input values 301 are multiplied with the received activation input values 500.

As explained herein, the activation input values 500 are conveyed on controllable bus lines 330. In some implementations, the controllable bus lines 330 are general purpose controllable bus lines. In some implementations, the controllable bus lines 330 can be dedicated to providing activation inputs. For example, as shown in FIG. 7B, activation input values can be provided to a tile 102 (e.g., to the cells 306 of a computational array within the tile 102) by lines 330, whereas other general purpose controllable bus lines 310b can be used to provide other data and/or instructions to the tile 102.

Figure 8B:
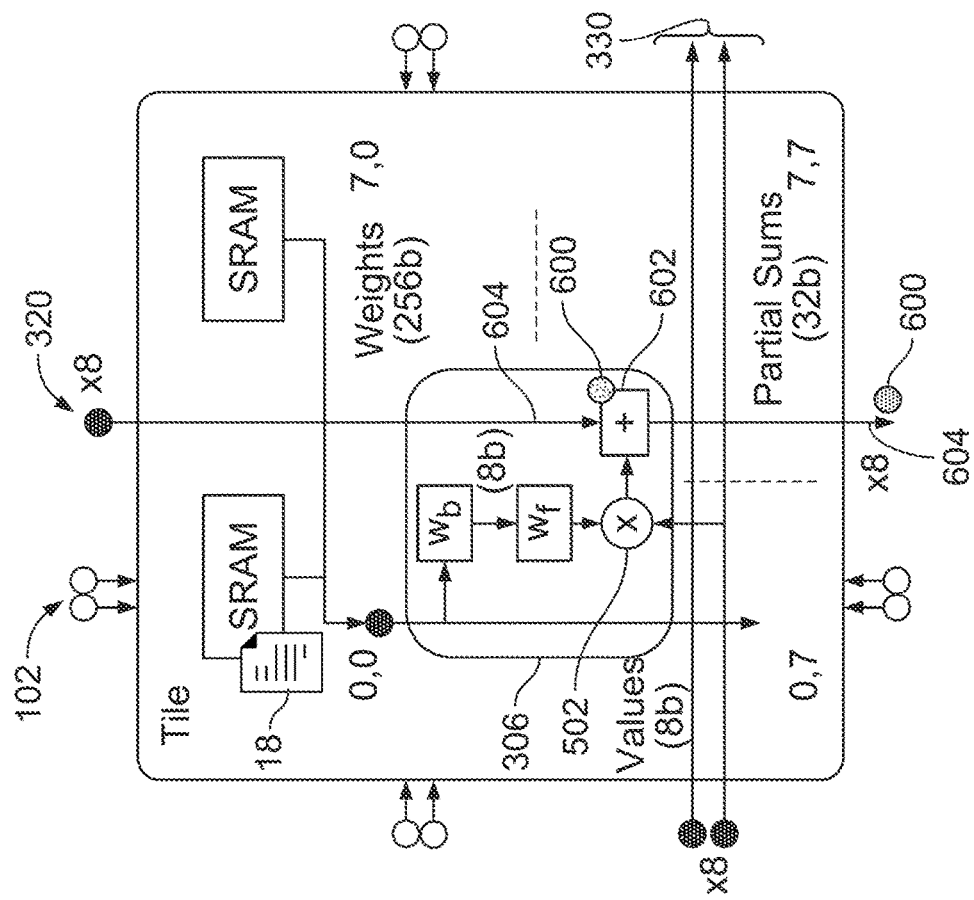
Figure 8A:
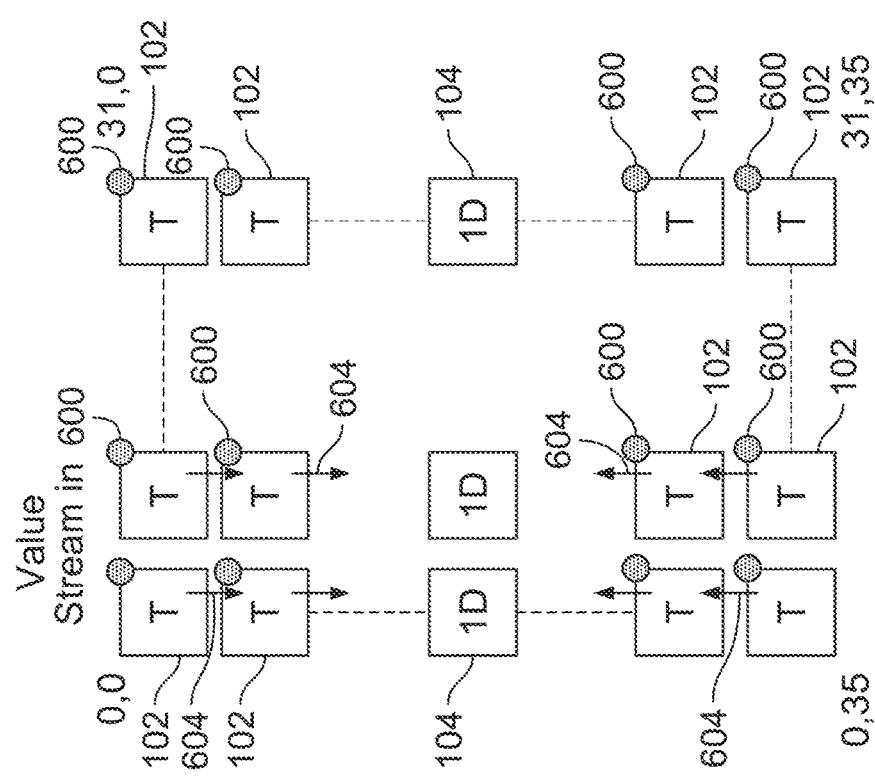

In a fourth step, as shown in FIG. 8B, at the scheduled counter value, a result of a computation between the weight input values 301 and the activation input values 500, within each cell 306, is passed to circuitry 602 within the cell 306 to produce an output value 600. In the example of FIG. 8B, the circuitry 602 includes a summation circuit. The summation circuit 602 within each cell 306 is configured to sum the product of the multiplier circuit 502 with another value obtained from either another tile 102 in the ASIC 100 or from another cell 306 within the computational array. The value obtained from another tile 102 or from another cell 306 can include, e.g., an accumulated value. Accordingly, the output value 600 of the summation circuit 602 is a new accumulated value. The summation circuit 602 then can send the new accumulated value 600 to another cell located in a bottom (e.g., in a south-flowing direction) adjacent cell of the computational array within the tile 102. The new accumulated value 600 can be used as an operand for a summation in the bottom adjacent cell. For the last row of cells within the computational array, the new accumulated values 600 can be transferred to another tile 102 within the ASIC 100, as shown in FIG. 8A. In another example, the new accumulated values 600 can be transferred to another tile 102 that is at least one tile away from the tile 102 in which the new accumulated values 600 were generated. Alternatively, as also shown in FIG. 8A, the new accumulated values 600 from the last row of cells within the computational array are transferred to the vector processing unit 104.

The accumulated values 600 that are transferred into a tile 102 or transferred out of a tile 102 can be conveyed along controllable bus lines 320. Each of the controllable bus lines 320 extend along a same direction. For example, as shown in FIG. 8B, the controllable bus lines 320 extend vertically along a grid dimension that is orthogonal to a grid dimension along which controllable bus lines 330 extend. Furthermore, as indicated by the arrows 604 in FIG. 8A, and the arrows 604 in FIG. 8B, the accumulated values 600 travel on the controllable bus lines 320 in either a north-flowing or south-flowing direction depending on the location of the vector processing unit 104 relative to the tiles 102 from which the accumulated values 600 are generated. For example, for the tiles 102 located above the vector processing unit 104 in FIG. 8A, the accumulated values 600 travel on the controllable bus lines 320 in a south-flowing direction towards the vector processing unit 104, whereas for the tiles 102 located below the vector processing unit 104, the accumulated values 600 travel in a north-flowing direction towards the vector processing unit 104.

Figure 9:
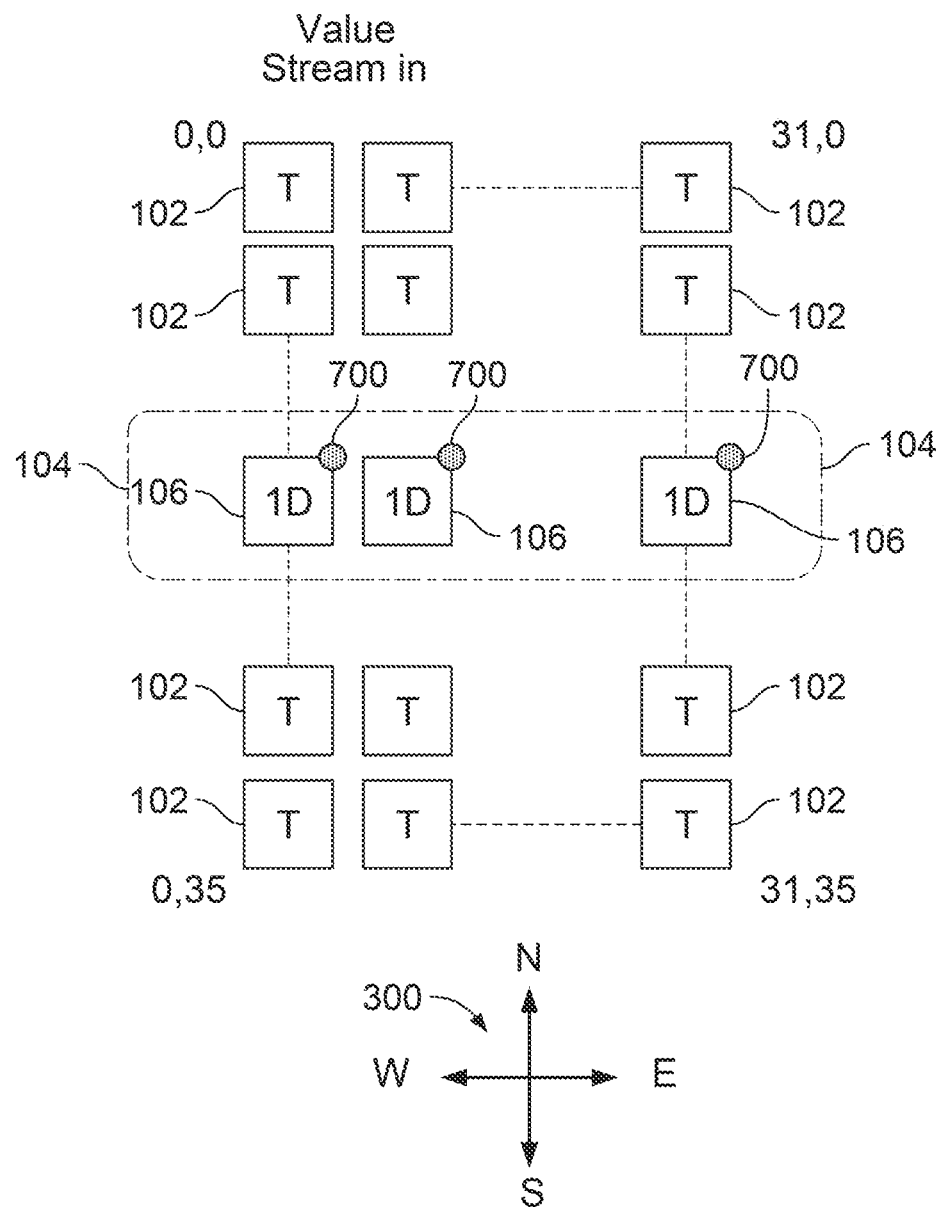

In a fifth step as shown in FIG. 9, at the scheduled counter value, the data (e.g., the accumulated values) received by the vector processing unit 104 are processed by the vector processing unit 104 to provide processed values 900. Processing of the data at the vector processing unit 104 can include applying a bias to the data received at the vector processing unit 104, performing additional accumulation operations, and/or applying a non-linear function (e.g., a rectifier function or sigmoid function as known in neural network systems) to the received data. Other operations also can be applied by the vector processing unit 104. The vector processing unit 104 can include circuitry arranged in multiple segments 106, in which each segment 106 is configured to process data received from a corresponding column of tiles 102 and generate a corresponding processed value 900.

Figures 10A, 10B:
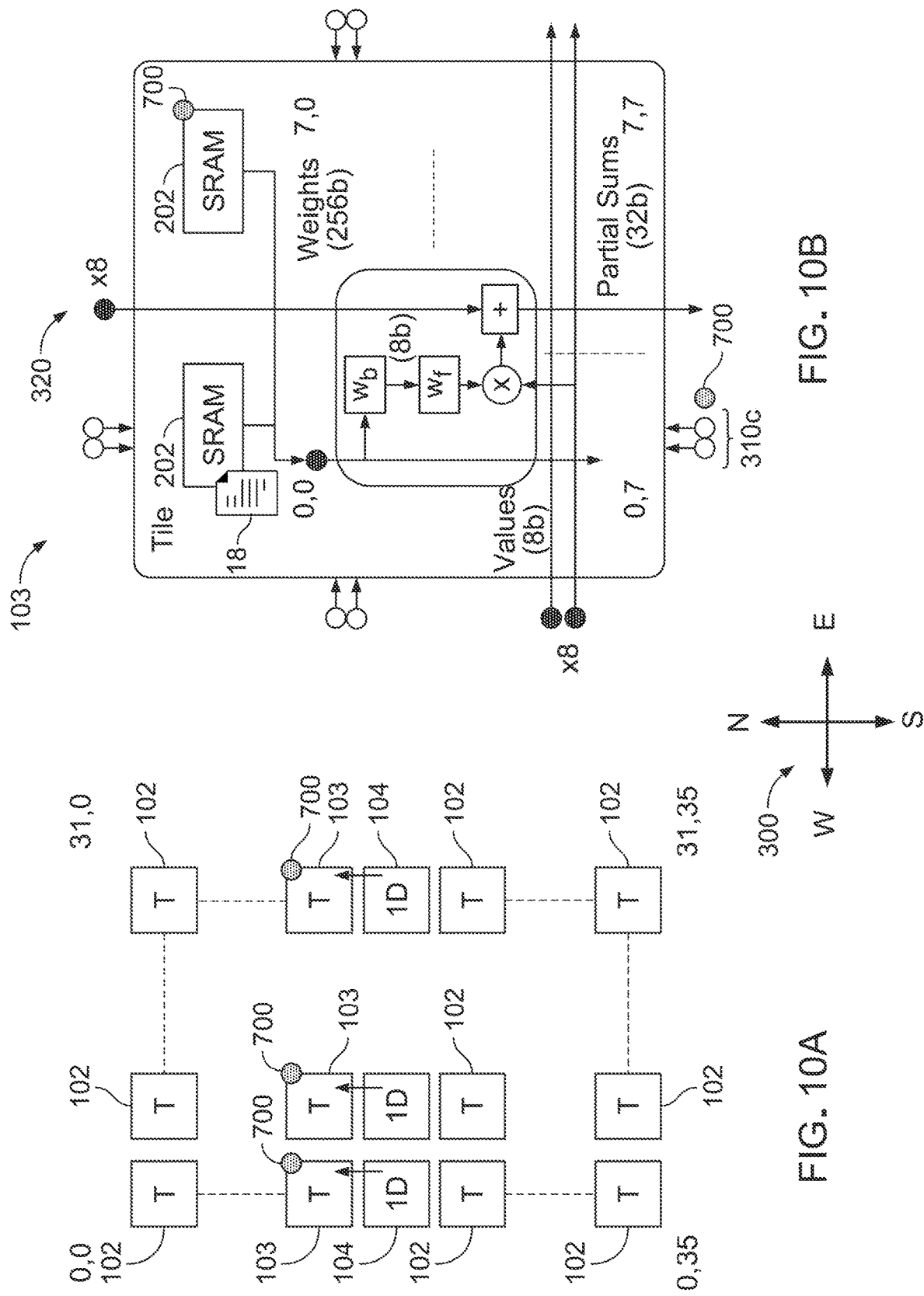

In a sixth step, as shown in FIG. 10A, at the scheduled counter value, the processed values 900 from the vector processing unit 104 are transferred to and stored in one or more tiles of the ASIC 100, e.g., a subset of the tiles of the ASIC 100. For example, the processed values 900 can be sent to the control tiles 103, which are located directly adjacent to the vector processing unit 104. Alternatively, or in addition, the processed values 900 can be sent to one or more of the other tiles 102 within the ASIC 100. The processed values 900 can be transferred to one or more tiles over a general purpose controllable bus line, such as controllable bus lines 310c. Upon reaching a tile (e.g., a control tile or other tile 102), the processed values 900 can be stored in the memory 202 of the tile. For example, the processed values 900 can be transferred to the memory 902 using a multiplexer associated with the controllable bus line 310c. The step of storing the processed values 900 can occur after the inferences of each model layer are obtained. In some implementations, the processed values 900 can be provided as input values to a next layer of the model.

Figures 11A, 11B:
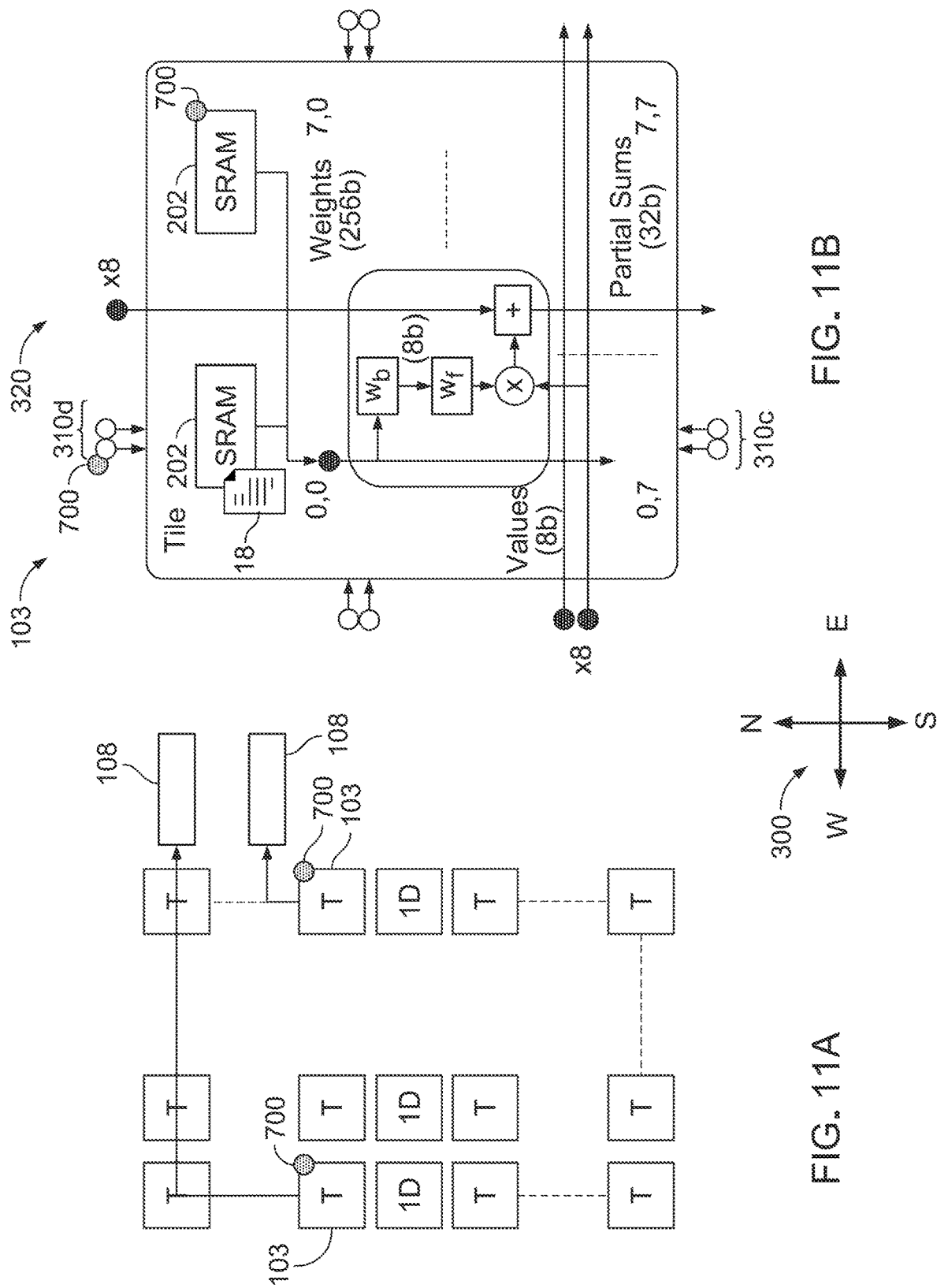

In a seventh step, as shown in FIGS. 11A and 11B, at the scheduled counter value, the processed values 900 can be exported off the ASIC 100. For example, the processed values 900 can be transferred from the memory 202 of the one or more control tiles to the communications interface 108. The processed values 900 can be conveyed to the communications interface 108 on controllable bus lines (e.g., controllable bus lines 310c and/or 310d). The processed values 900 can be transferred to the controllable bus lines through multiplexers associated with the bus lines.

The processed values 900 may be exported off the ASIC 100, e.g., if the inferences for a final layer of a model have been obtained or if the model has been partitioned among multiple ASICs and the inferences for the final layer associated with ASIC 100 have been obtained. The processed values 900 can be received and exported by the SerDes interfaces of the communications interface 108 to another destination including, but not limited to, e.g., another ASIC 100 or a field-programmable gate array chip.

The example process described with respect to FIGS. 5A-11B may require that the activation values and weight inputs being fully propagated throughout the computational arrays of each tile before the cell computations are performed, or the cells may perform computations before all values are fully propagated. In either case, the operations schedules of the individual tiles can be coordinated so that the computations are properly timed. For example, if a particular machine learning program requires the activation values and weight inputs to be fully propagated through the computational arrays of each tile before the cell computations are performed, the operation instructions can schedule the execution of the computation for a time that ensures the activation values and weights are fully propagated. Furthermore, although the ASIC 100 has been described with weight inputs being sent to columns of a computational array and activation inputs being sent to rows of the computational array, in some implementations, the weight inputs are sent to rows of the array and the activation inputs are sent to columns of the array.

Furthermore, although the computational arrays have been described herein as using individual summation circuits within each cell, groups of cells within the computational array (e.g., all the cells within a column) may be coupled directly to a single summation circuit, which sums the received outputs from the cells in the group, thus reducing the number of summation circuits required to store the outputs.

Embodiments of the subject matter and the functional operations described in this specification can be implemented in digital electronic circuitry, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC. The apparatus can also include, in addition to hardware, code that creates an execution environment for the computer program in question, e.g., code that constitutes processor firmware, a protocol stack, a database management system, an operating system, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA, an ASIC, or a GPGPU (general purpose graphics processing unit).

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, although bus lines are described as "controllable," not all bus lines need to have the same level of control. For instance, there can be varying degrees of controllability, where some bus lines can be controlled only where some bus lines are restricted in terms of the number of tiles from which they can source data or to which they can send data. In an another example, some bus lines may be dedicated to providing data along a single direction, such as north, east, west, or south as described herein. In some cases, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. An integrated circuit device comprising:
   a counter;
   a first hardware block communicably coupled to the counter and configured to operate according to a first schedule that comprises a first set of operations each of which is scheduled to be executed by the first hardware block at a first respective value of the counter; and a second hardware block communicably coupled to the counter and to the first hardware block, the second hardware block configured to operate according to a second schedule that comprises a second set of operations each of which is scheduled to be executed by the second hardware block at a second respective value of the counter, and wherein operations of the second schedule are coordinated with operations of the first schedule such that compute operations in the first schedule are executed concurrently with data exchange operations in the second schedule, and that the first schedule triggers the first hardware block to send data to the second hardware block at a first pre-scheduled value of the counter, and the second schedule triggers the second hardware block to accept the data at an input at a second pre-scheduled value of the counter that is after the first pre-scheduled value.

2. The device of claim 1, wherein the first set of operations and the second set of operations each comprise a respective portion of a machine learning program.

3. The device of claim 1, wherein each operation in the first set of operations executes in a predetermined number of clock cycles.

4. The device of claim 1, wherein operations of the first schedule and the second schedule are coordinated to allow exchange of data between the first hardware block and the second hardware block independent of flow control signals.

5. The device of claim 1, further comprising a plurality of other hardware blocks, wherein operations of the first schedule are coordinated with respective operation schedules of the other hardware blocks to allow exchange data between the first hardware block and one or more of the other hardware blocks independent of data flow control signals.

6. The device of claim 1, wherein the first hardware block comprises:
   local memory configured to store the first schedule; and
   control circuitry coupled to the local memory and configured to execute the first set of operations of the first schedule.

7. The device of claim 6, wherein the control circuitry is configured to decompress a portion of the first schedule before executing operations included in the portion.

8. The device of claim 1, wherein the integrated circuit device is an application specific integrated circuit.

9. The device of claim 1, wherein the first hardware block and the second hardware block are hardware tiles including special purpose circuitry configured to perform neural network operations.

10. The device of claim 9, wherein the first hardware block comprises:
    a computational array of cells; and
    local memory coupled to the computational array of cells.

11. The device of claim 1, wherein the first schedule and the second schedule each comprise a portion of a program executed by the integrated circuit device.

12. An integrated circuit operating method comprising:
    obtaining, for a first hardware block of an integrated circuit device, a first schedule that identifies a first set of operations to be performed by the first hardware block;
    obtaining, for a second hardware block of the integrated circuit device, a second schedule that identifies a second set of operations to be performed by the second hardware block, wherein operations of the second schedule are coordinated with operations of the first schedule such that compute operations in the first schedule are executed concurrently with data exchange operations in the second schedule, and that the first schedule triggers the first hardware block to send data to the second block at a first pre-scheduled value of a counter, and the second schedule triggers the second hardware block to accept the data at an input at a second pre-scheduled value of the counter that is after the first pre-scheduled value;
    performing, by the first hardware block, the first set of operations according to the first schedule; and
    performing, by the second hardware block, the second set of operations according to the second schedule.

13. The method of claim 12, wherein the first schedule and the second schedule each comprise a portion of a program executed by the integrated circuit device.

14. The method of claim 12, wherein the first set of operations and the second set of operations each comprise a respective portion of a machine learning program.

15. The method of claim 12, wherein each operation in the first set of operations executes in a predetermined number of clock cycles.

16. The method of claim 12, wherein operations of the first schedule and the second schedule are coordinated to allow exchange of data between the first hardware block and the second hardware block independent of flow control signals.

17. The method of claim 12, further comprising decompressing, by the first hardware block, a portion of the first schedule before executing operations included in the portion.

18. The method of claim 12, wherein the first schedule comprises, for each operation in the first set of operations, a scheduled counter value and data indicating a particular operation to be executed by the first hardware block at the scheduled counter value.

19. The method of claim 12, wherein performing, by the first hardware block, the first set of operations according to the first schedule comprises:
    receiving, from a counter, a first counter value that equals a first scheduled counter value of a first operation in the first set of operations;
    in response to receiving the first counter value, causing a first set of one or more computational units of the first hardware block to execute the first operation;
    receiving, from the counter, a second counter value that equals a second scheduled counter value of a second operation in the first set of operations; and
    in response to receiving the second counter value, causing a second set of one or more computational units of the first hardware block to execute the second operation.

20. The method of claim 12, wherein the first hardware block and the second hardware block are hardware tiles including special purpose circuitry configured to perform neural network operations.

* * * * *